Jan. 2, 1940.  G. GASTRICH ET AL  2,185,844
METHOD AND MEANS FOR PRODUCING KNITTED ELASTIC FABRICS
Filed April 8, 1937  11 Sheets-Sheet 1
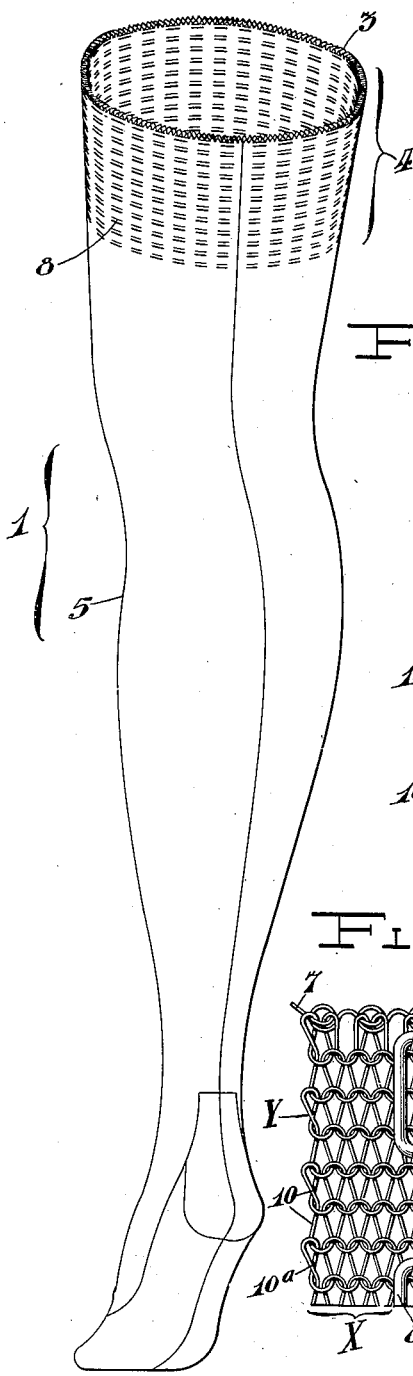
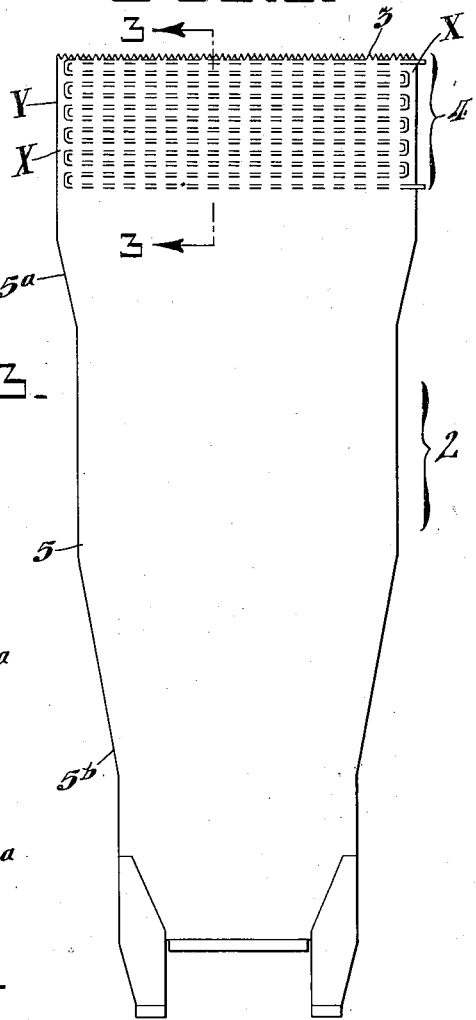
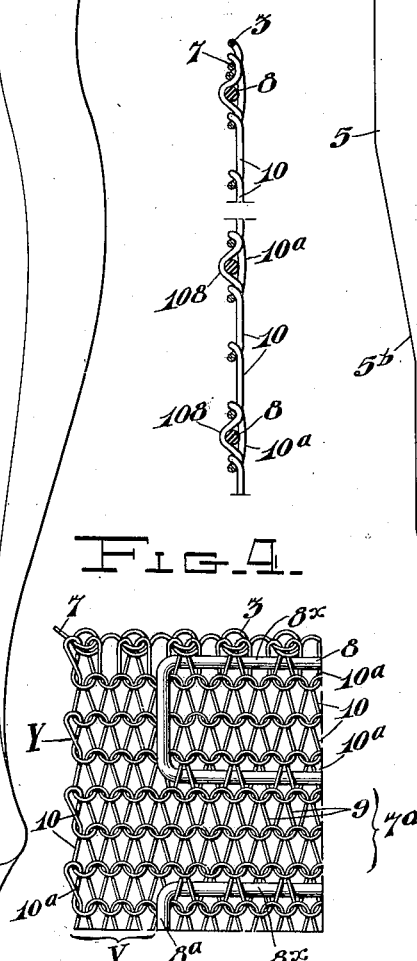
INVENTORS:
Gustav Gastrich &
Herbert Erich Haehnel,
BY Alfred E. Tschinger,
ATTORNEY.

Jan. 2, 1940. G. GASTRICH ET AL 2,185,844
METHOD AND MEANS FOR PRODUCING KNITTED ELASTIC FABRICS
Filed April 8, 1937 11 Sheets-Sheet 2
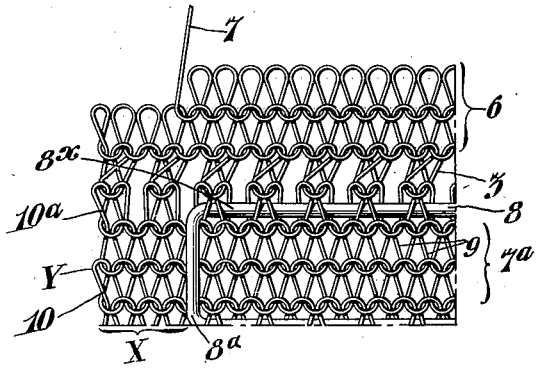
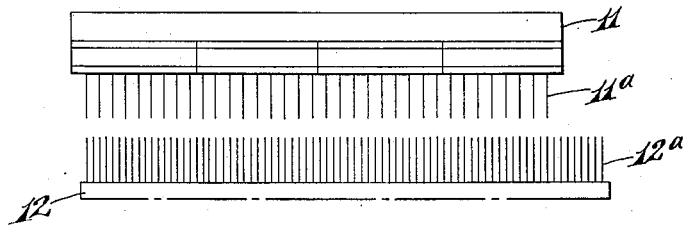
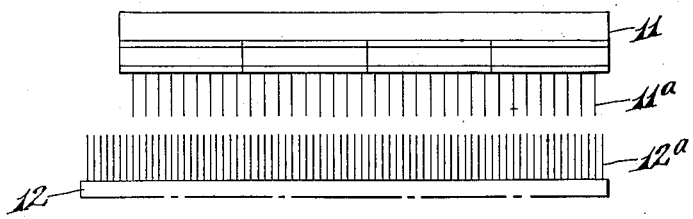
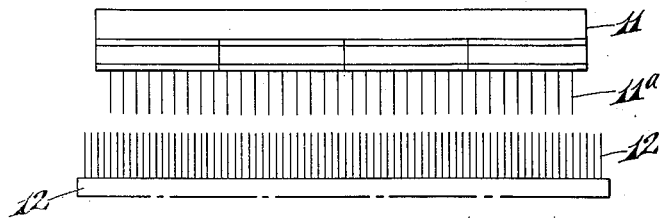
INVENTORS:
Gustav Gastrich &
Herbert Erich Haehnel,
BY
ATTORNEY.

Jan. 2, 1940.  G. GASTRICH ET AL  2,185,844
METHOD AND MEANS FOR PRODUCING KNITTED ELASTIC FABRICS
Filed April 8, 1937  11 Sheets-Sheet 3
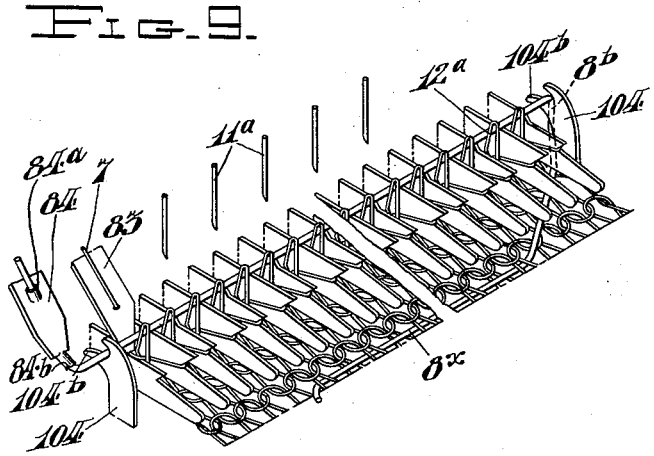
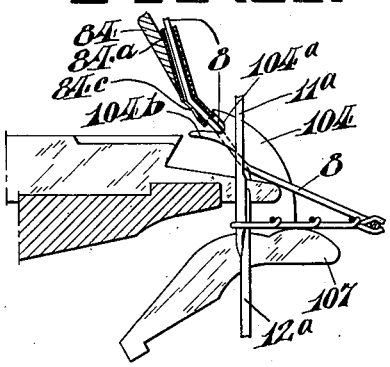
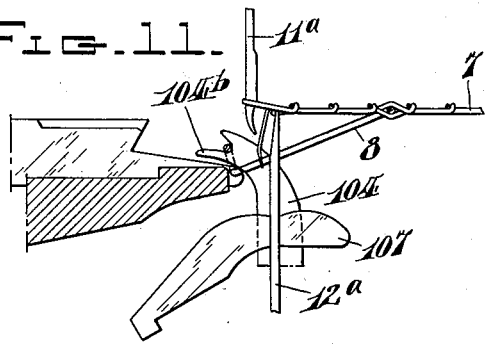
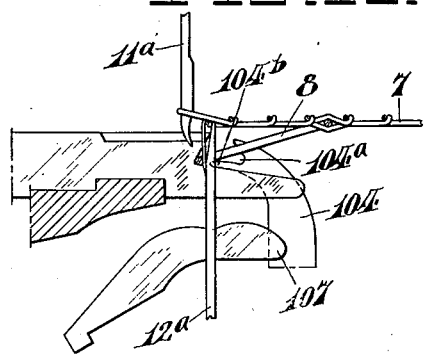
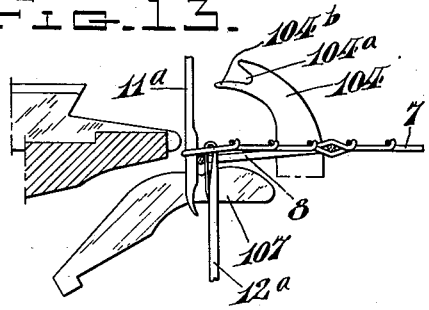
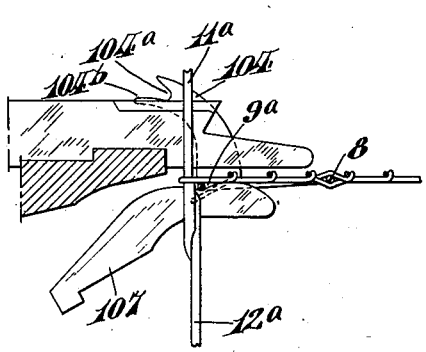
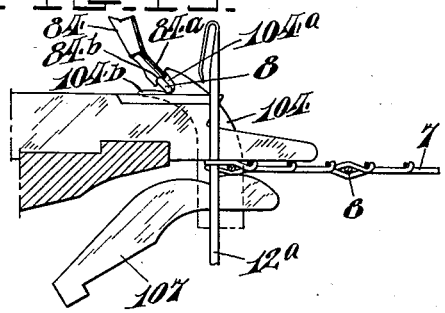
INVENTORS:
Gustav Gastrich &
Herbert Erich Haehnel,
BY
Alfred E. Oschinger,
ATTORNEY.

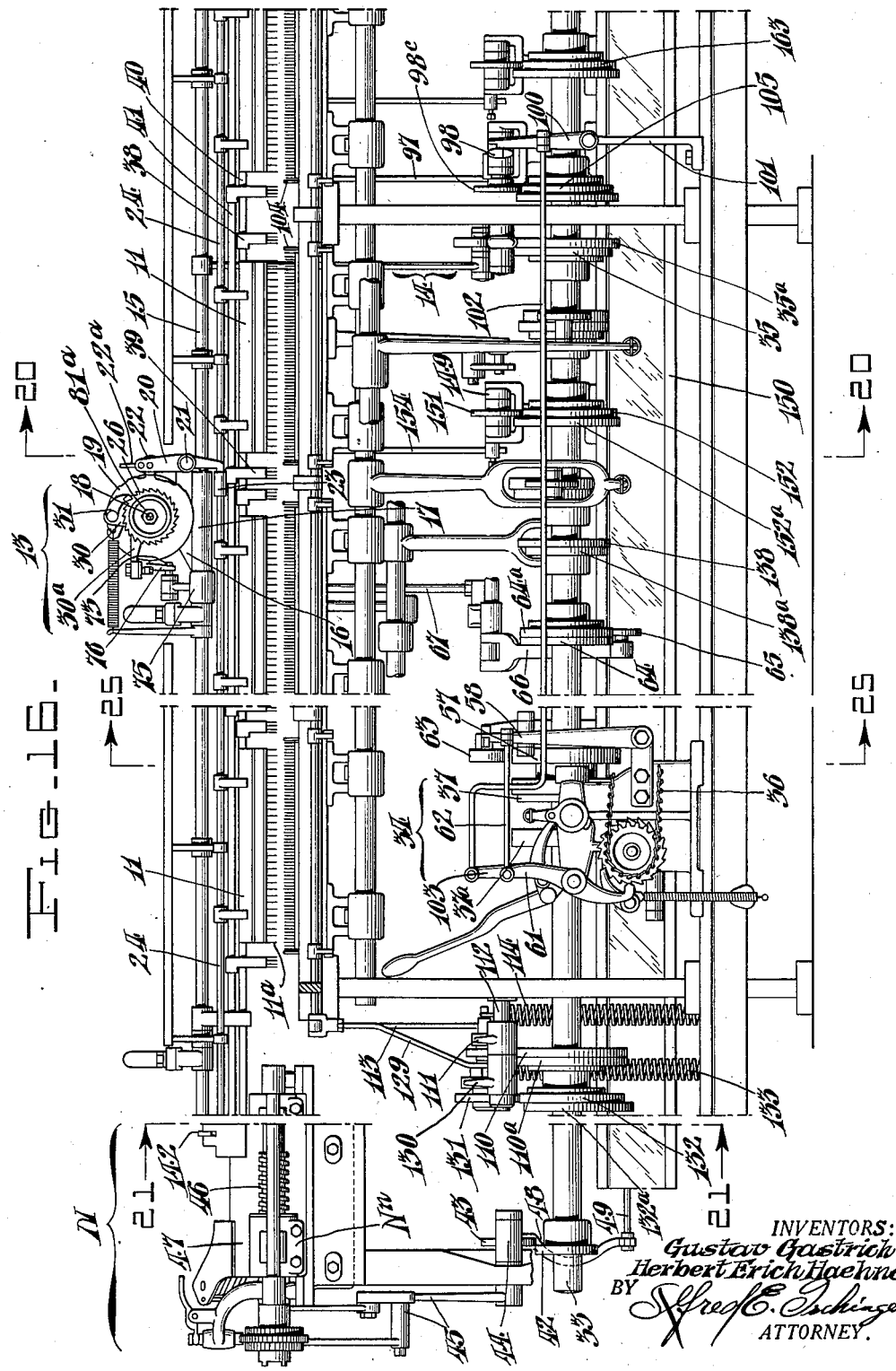

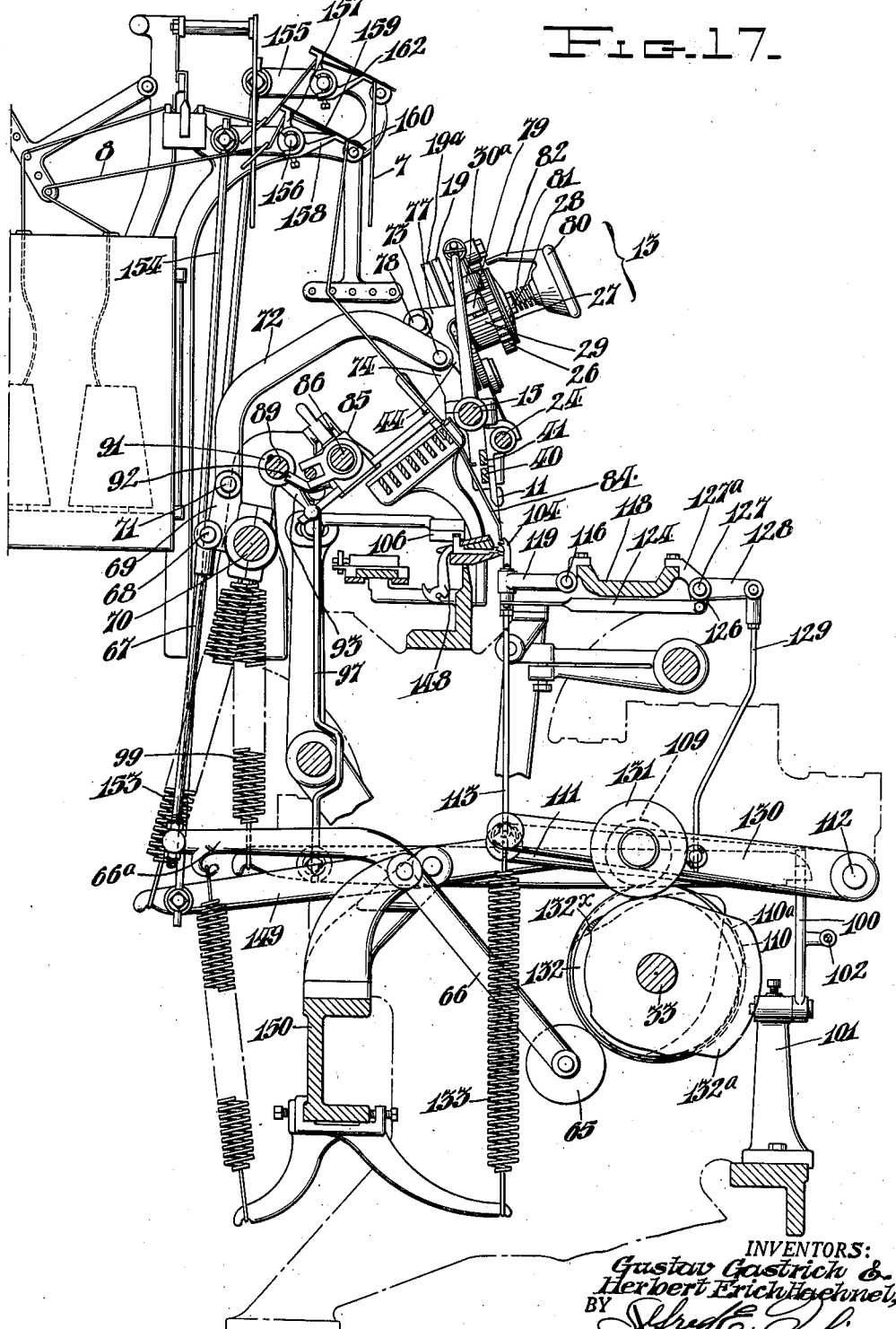

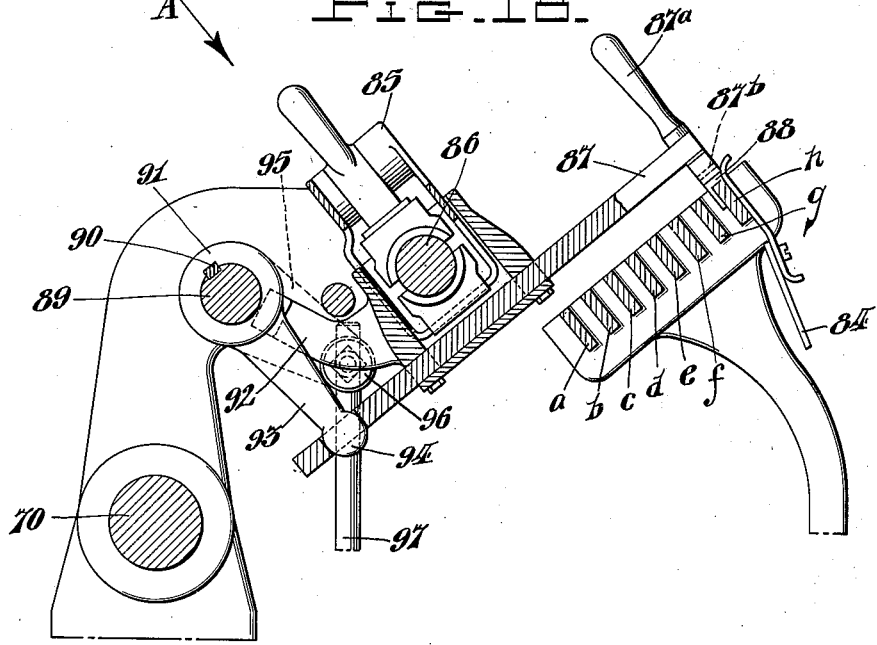
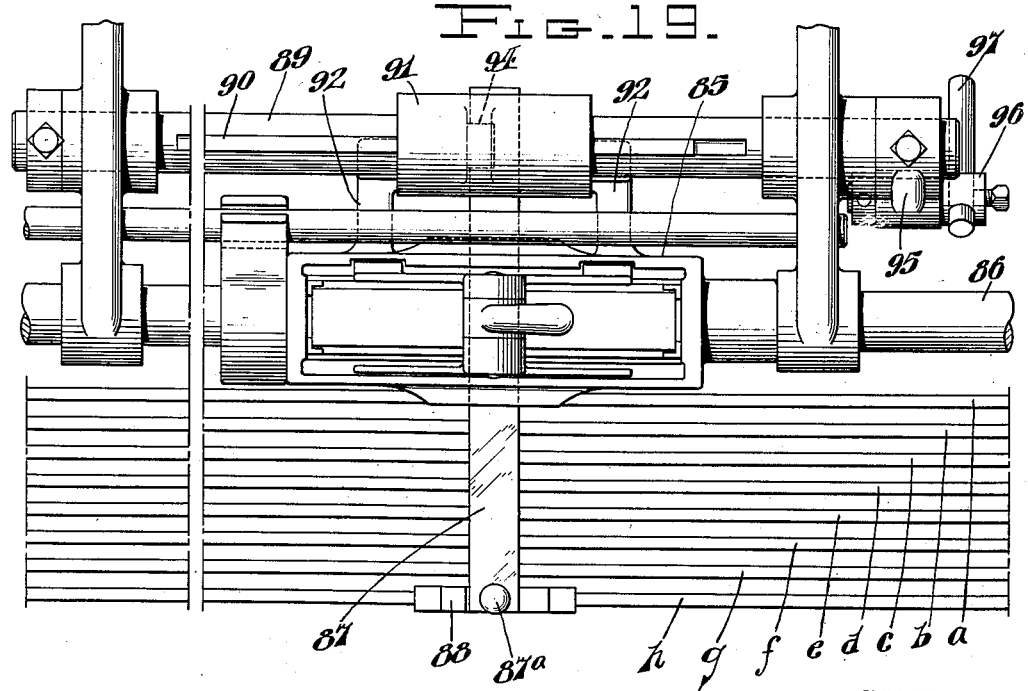

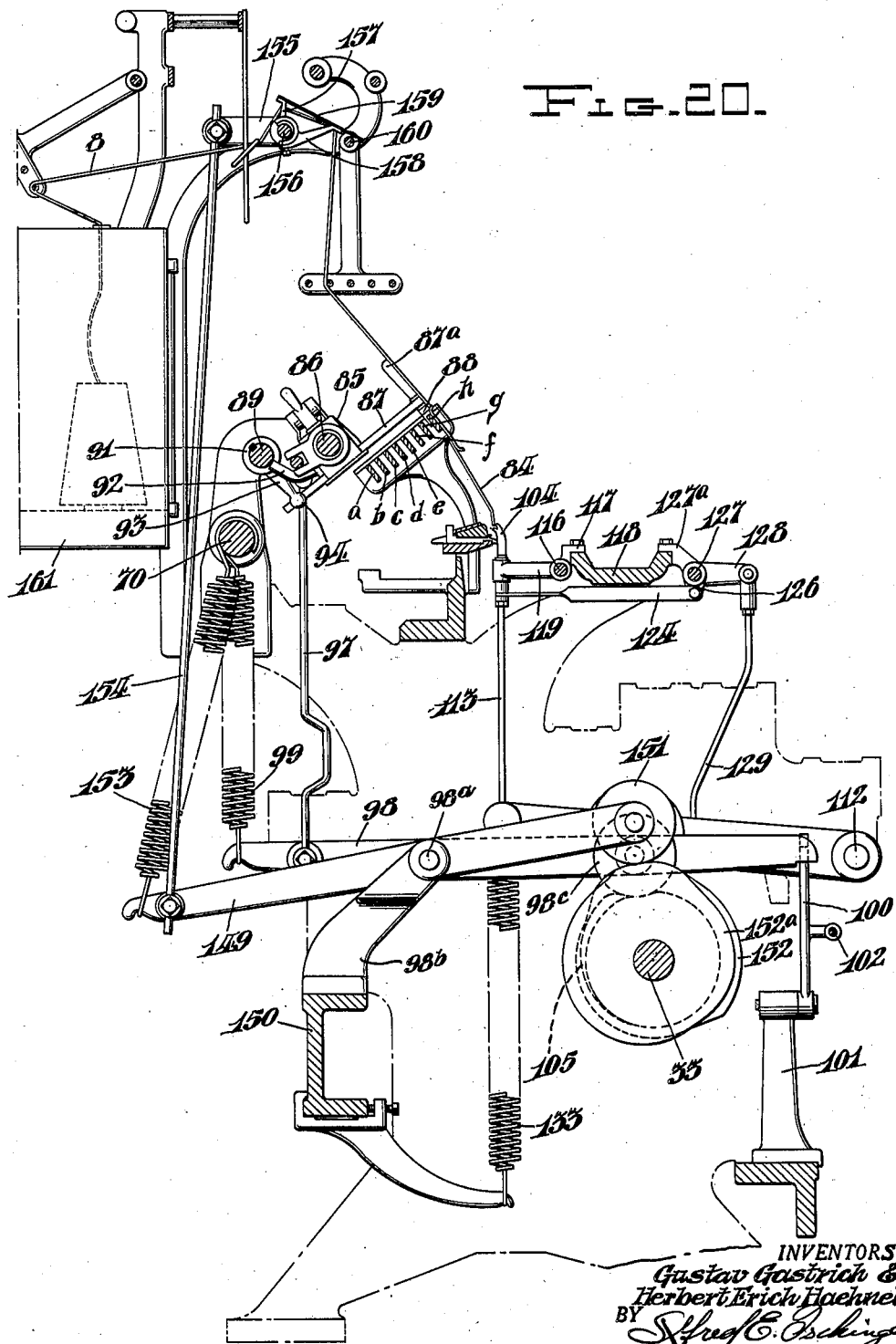

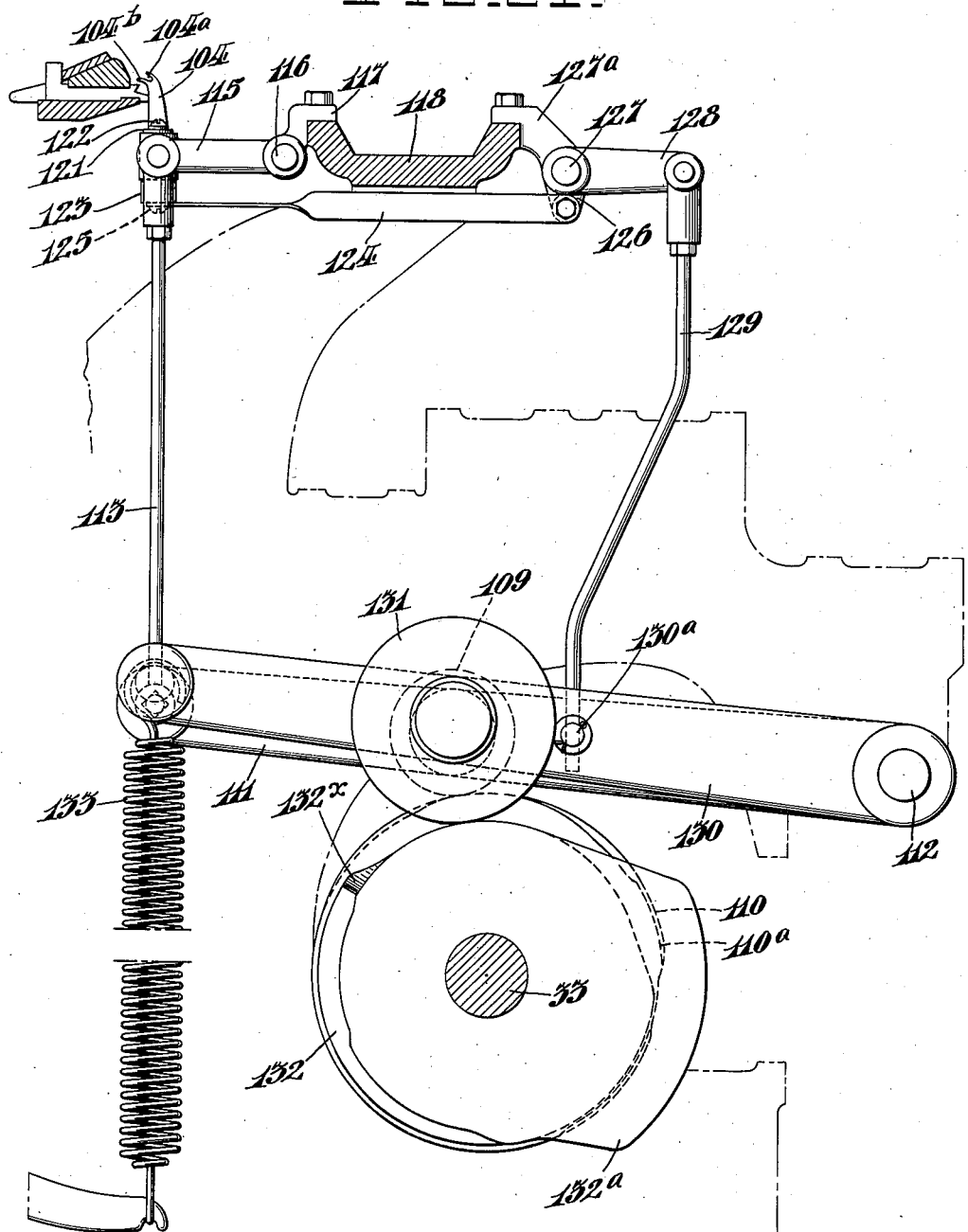

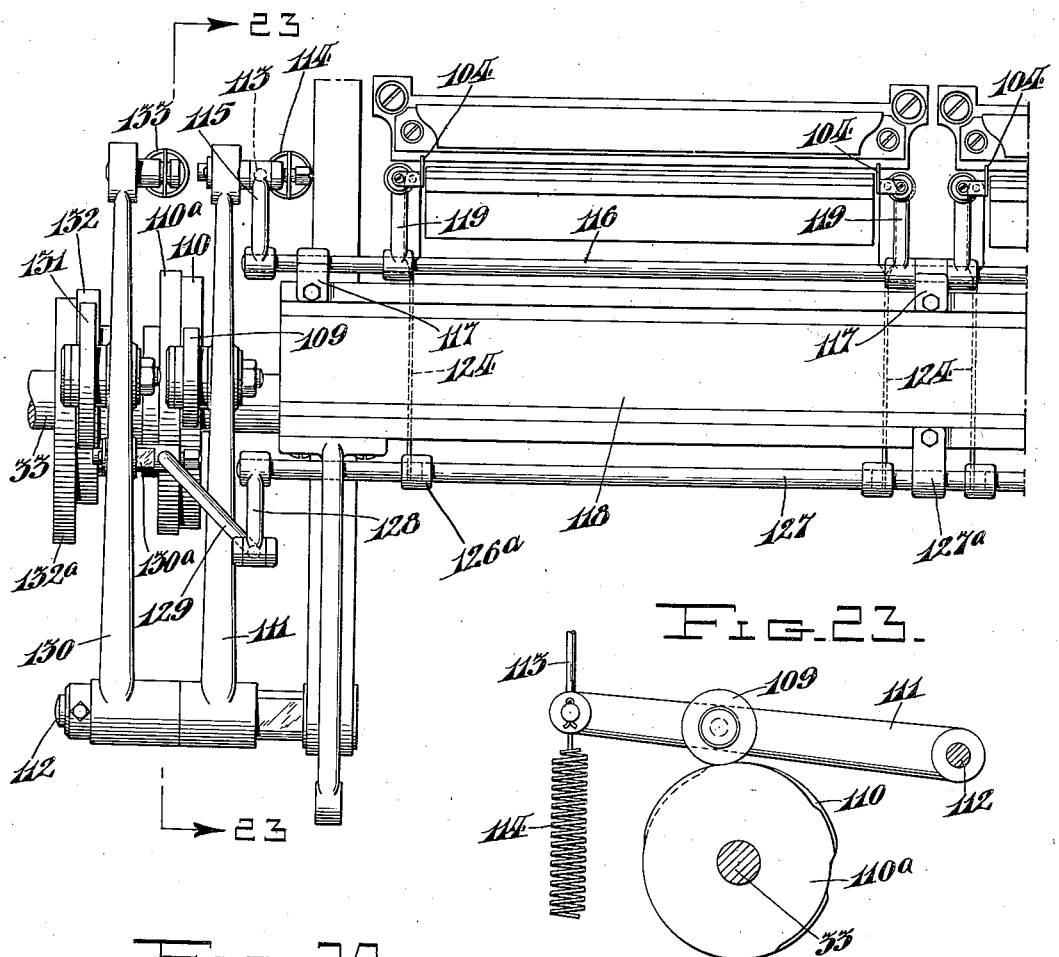
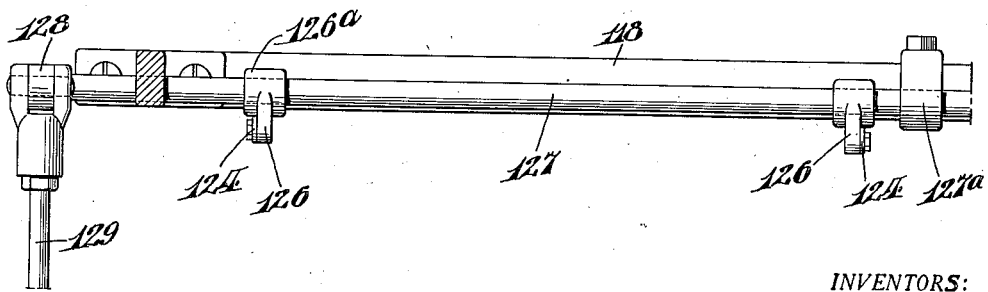

Jan. 2, 1940.　　　G. GASTRICH ET AL　　　2,185,844
METHOD AND MEANS FOR PRODUCING KNITTED ELASTIC FABRICS
Filed April 8, 1937　　　11 Sheets-Sheet 10

INVENTORS:
Gustav Gastrich &
Herbert Erich Haehnel,
BY
ATTORNEY.

Jan. 2, 1940.  G. GASTRICH ET AL  2,185,844
METHOD AND MEANS FOR PRODUCING KNITTED ELASTIC FABRICS
Filed April 8, 1937   11 Sheets-Sheet 11
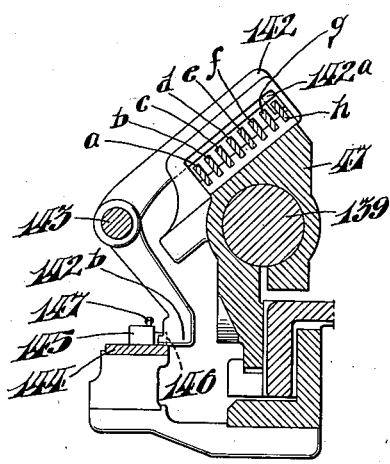
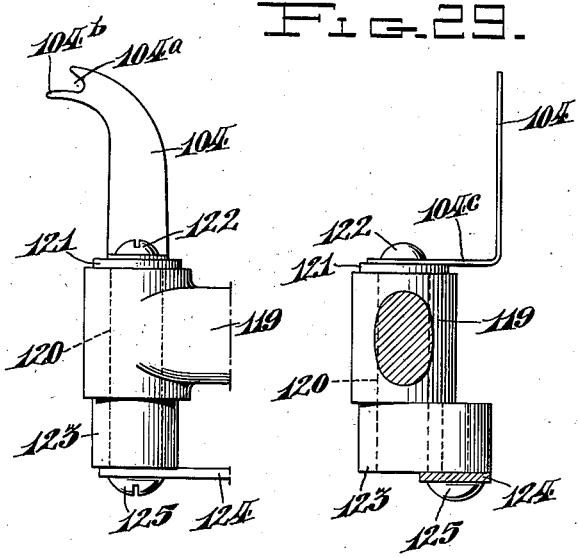
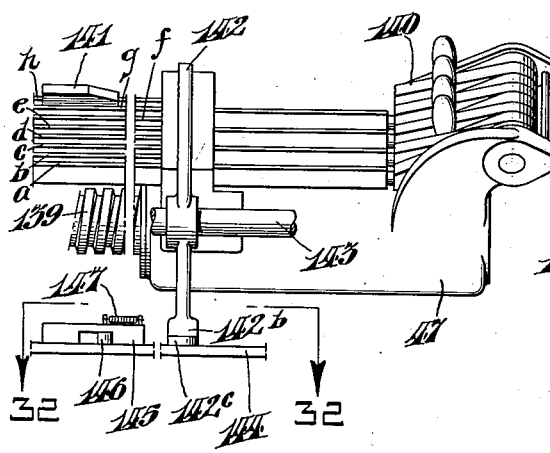
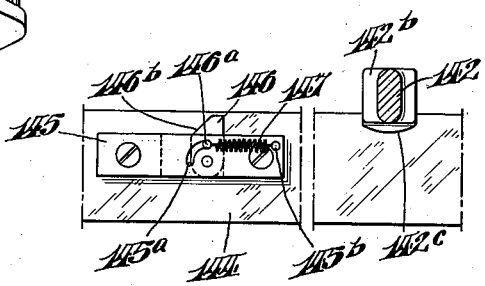
INVENTORS:
Gustav Gastrich &
Herbert Erich Haehnel,
BY
ATTORNEY.

Patented Jan. 2, 1940

2,185,844

UNITED STATES PATENT OFFICE 2,185,844

METHOD AND MEANS FOR PRODUCING KNITTED ELASTIC FABRICS

Gustav Gastrich, Wyomissing, and Herbert Erich Haehnel, West Reading, Pa., assignors to Textile Machine Works, Wyomissing, Pa., a corporation of Pennsylvania Application April 8, 1937, Serial No. 135,664

35 Claims. (Cl. 66—83)

This invention relates to a method and means for producing knitted elastic fabric structure.

One object of our invention is to provide means for producing a knitted flat fabric having an additional yarn held between certain of the loops, in some or all of the courses, and which shall have narrow areas for seaming purposes along the edges free of the additional yarn and a transverse edge completely of anti-ravel construction.

Another object of our invention is to provide a method of knitting an elastic flat fabric capable of being carried out by minor changes in a standard type knitting machine and whereby a well appearing single ply fabric may be made having sufficient body to simulate a double ply welt.

Another object of the invention is to provide a flat knitting machine and a method of operating the same whereby an elastic yarn may be laid at the same, or approximately the same, time as the yarn to be knitted and held away from the needles while the loops of a given course are formed and the elastic yarn then inserted into said course in unstretched condition.

Another object of our invention is to provide a flat knitting machine and a method of operating the same whereby an elastic yarn may be inserted betwen loops in a succession of walewise spaced knitted courses in a fabric, in a manner to ensure that the fabric will lie flat without puckers or gathers.

Another object of our invention is to provide a novel method of laying a reinforcing yarn and of introducing it into knitted courses in straight lengths.

Another object of the invention is to provide a novel mechanical method whereby a flat knitted fabric may be made with unknitted reinforcing in a central zone and with unreinforced seaming zones along the selvedges.

Another object of the invention is to provide a method and a means whereby the excess length of a section of straight yarn which is initially as long or longer than a course and which has been inserted between loops in only a portion of a course may be taken up without puckering the fabric.

Another object of the invention is to provide an arrangement whereby a known center lace attachment may be adapted to cooperate with the pattern chain of a flat knitting machine in inserting a straight strand between loops of a given knitted course.

Another object of our invention is to provide an arrangement whereby a yarn for knitting and another yarn can be laid at substantially the same time but the other yarn held out of the path of the needles until after the formation of the loops for a course and then caught by the loops to incorporate the other yarn into the fabric.

With these and other objects in view, which will become apparent from the following detailed description of the illustrative embodiment of the invention shown in the accompanying drawings, our invention resides in the novel fabric, method of producing fabric, mechanisms, elements of construction and parts in cooperative relationship as hereinafter set forth in the claims.

In the drawings:

Fig. 1 is a perspective view of a stocking made in accordance with our invention;

Fig. 2 is an elevation of a blank for the welt and leg portion of the stocking shown in Fig. 1;

Fig. 3 is a sectional view on the line 3—3 of Fig. 2;

Fig. 4 is a detail on an enlarged scale of the upper left hand corner of Fig. 2;

Fig. 5 is a detail view similar to Fig. 4, but showing certain ravel courses before they have been pulled out;

Fig. 6 is a diagrammatic view showing the relative positions of the needle bar and the lock stitch bar at the beginning of the formation of the lock stitch course shown in Figs. 4 and 5;

Fig. 7 is a view similar to Fig. 6 showing the relative positions of the parts in a period midway in the formation of the lock stitch course;

Fig. 8 is a diagrammatic view showing the relative positions of the needle bar and the lock stitch bar at the beginning of one of the reinforced or elastic courses shown in Figs. 4 and 5;

Fig. 9 is a detail perspective view showing the relative positions of certain parts just after the formation of the sinker loops for a reinforced or elastic course;

Fig. 10 is a detail view illustrating the position of the parts just before the alternate loops have been lifted from their needles to permit the insertion of a reinforcing or elastic yarn in a course;

Fig. 11 is a view similar to Fig. 10 but showing alternate loops lifted from their needles, the lock stitch points and the hooks for the elastic yarn being in different positions;

Fig. 12 is a view similar to Fig. 11 but in which the sinkers and dividers have pushed the elastic yarn into the angle between the lifted loops and those on the needles, the hooks having moved forward out of the way;

Fig. 13 is a view similar to Fig. 12 showing the mechanism thereof after the alternate loops are restored to their needles, the sinkers and dividers having been withdrawn and projected again to push the loops down on the needles;

Fig. 14 is a view similar to Fig. 13 except that the points, needles and hooks are in different positions;

Fig. 15 is a vew similar to Fig. 14 except that the lock stitch points have been drawn up out of the way;

Fig. 16 is an elevational view of a portion of a Cotton type of flat knitting machine constructed in accordance with our invention;

Fig. 17 is a sectional elevation of the machine shown in Fig. 16, the line of section being near the left end of the machine;

Fig. 18 is an enlarged detailed view of the friction box shown in Fig. 17 certain of the parts being broken away;

Fig. 19 is a top plan view of certain of the mechanism shown in Fig. 18, taken in the direction of the arrow "A" and turned about an angle of ninety degrees relative to said figure;

Fig. 20 is a sectional view taken on the line 20—20 of Fig. 16;

Fig. 21 is a sectional view taken substantially along the line 21—21 of Fig. 16;

Fig. 22 is a detail plan view of the mechanism of Fig. 16 illustrated in Fig. 21;

Fig. 23 is a sectional view taken on the line 23—23 of Fig. 22;

Fig. 24 is a front elevational view showing certain details of Fig. 22;

Fig. 28 is a detail view of one of the hooks shown in Fig. 21 and enlarged relative thereto;

Fig. 29 is a view taken from the right of Fig. 28;

Fig. 30 is a sectional view of the carrier rod end stop nut shown in Fig. 16;

Fig. 31 is a rear elevational view of the carrier rod end stop nut shown in Fig. 16; and Fig. 32 is a sectional view taken along the line 32—32 of Fig. 31.

The drawings show a flat or full-fashioned knitting machine having a main cam shaft, but only those parts of a knitting machine necessary for an understanding of the invention are shown, the various other parts and mechanisms and their manner of operation are well known in the art, and are shown and described in detail in the "Reading Full Fashioned Knitting Machine Catalogue" (copyrighted 1929 and 1935) and two pamphlets entitled "The Reading Full Fashioned Knitting Machine" comprising articles reprinted from "The Yarn Carrier" (copyrighted 1935 and 1936), all published by the Textile Machine Works, Reading, Pennsylvania.

Figure 25:
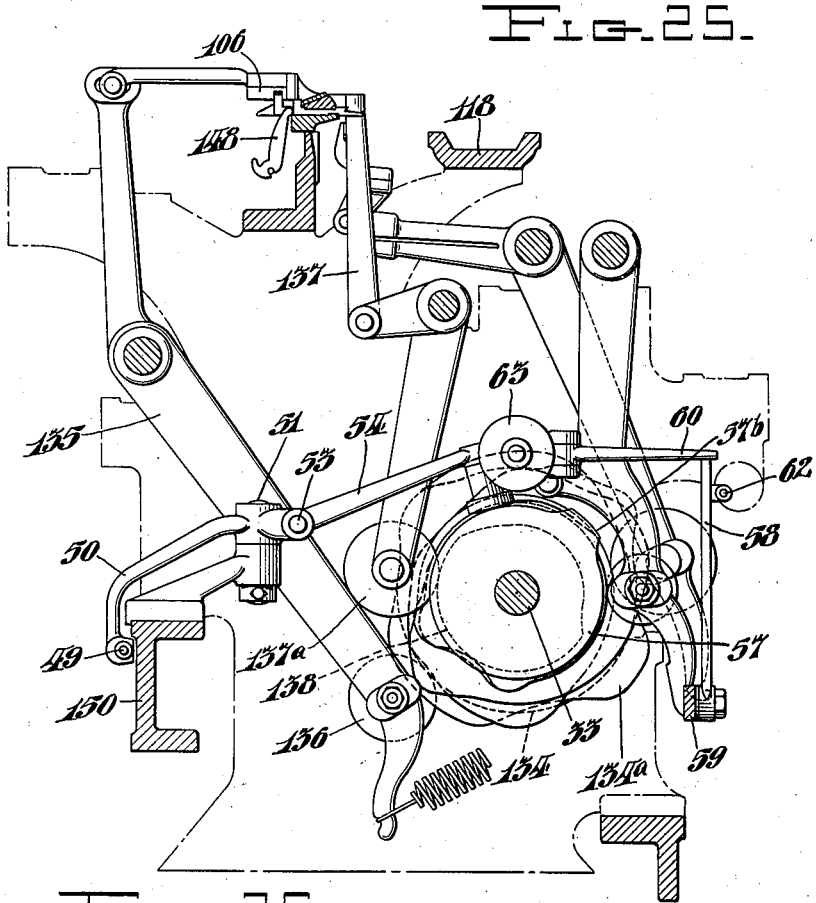
Fig. 25 is a sectional view taken substantially on the line 25—25 of Fig. 16.
Figure 26:
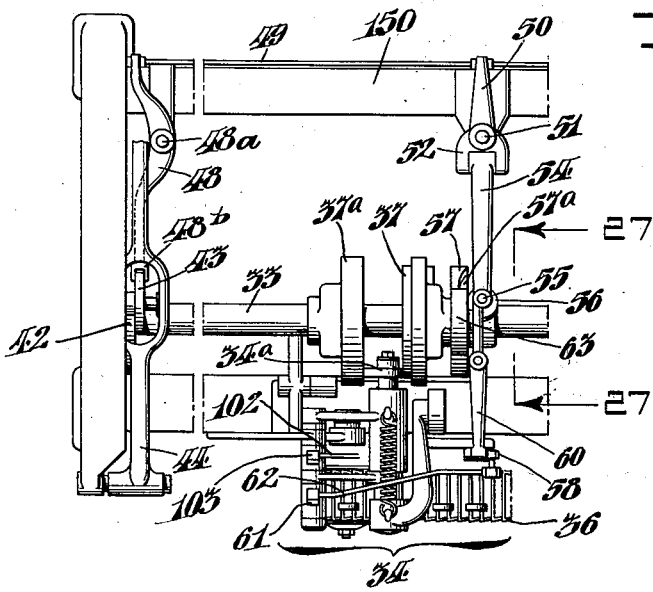
Fig. 26 is a detail plan view of certain parts lying in the lower portion of the machine and at the left end of Fig. 16.
Figure 27:
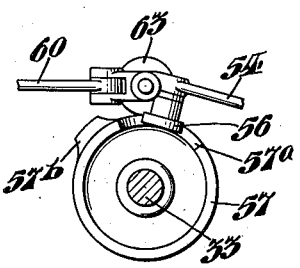
Fig. 27 is a sectional view taken along the line 27—27 of Fig. 26.

In all the figures of the drawings except Fig. 25, the main cam shaft is shown in the angular position in which it must lie at the time it is shifted. In Fig. 25, however, the main cam shaft is shown in a position approximately 90° of arc beyond the shift position.

A fabric made in accordance with our invention is well suited for use in welts on full-fashioned hosiery and in such case the free edge may be of anti-ravel construction, either having elastic at the extreme edge or not, as desired.

The full-fashioned knitted stocking 1 illustrated in Fig. 1 is made largely from a blank 2 and has a lock stitch course 3 at its top. The welt portion 4 is of a fabric made in accordance with our invention and is of a flat knitted construction as is also the leg portion 5, parts 4 and 5 being also knitted together, the leg being full fashioned as illustrated in Fig. 1 and as indicated by the narrowing at 5a and 5b in Fig. 2. Welt 4 may be of either single ply or double ply fabric, but is well adapted to render the double ply well largely unnecessary. In making the fabric illustrated, and as indicated in Fig. 5, several ordinary ravel courses 6 are first knitted of the ordinary or non-elastic body yarn 7 and an anti-ravel course 3 provided. This may be done by transferring alternate needle loops to needles already having loops thereon. When the ravel courses first knitted are then pulled out, a lock-stitch anti-ravel or picot edge 3 results. However, an anti-ravel edge such as that disclosed in the prior Patent No. 2,067,486, issued January 12, 1937, for Hosiery, to Gustav Gastrich, one of the inventors hereof, may be employed. A fabric within our invention has an ordinary body 7a of loops 9 interknitted in courses 10 in the way ordinarily used for flat knitted fabrics and which may be either of one yarn or several yarns as desired depending on whether or not the ringless system of knitted is employed, but preferably only a single yarn in a given course. However, our said fabric includes also an additional yarn 8 inserted into some or all of the courses of the body fabric, preferably, at desired intervals. Such additional yarn 8 may desirably be elastic and heavier than the body yarn 7 and is not acted on by the needles in any way but is inserted into the courses 10a so as to form straight runs 8x. The knitted loops 9 of body yarn are arranged in the courses 10a containing yarn 8 to lie some on one side of the elastic yarn and some on the other side thereof so that the loops of the courses embrace the elastic yarn 8 substantially throughout the coursewise extent of the elastic yarn, the resulting fabric having therefore the elastic yarn interwoven in the knitted loops of body yarn.

In case the welt is to be double ply, instead of knitting only a few courses before the lock-stitch course, an ordinary plain knitted section the full length of the double ply portion is knitted, the lock stitch course is knitted, and another section of the length of the double ply portion is knitted containing the elastic yarn 8. Thereupon, the first course is topped from the welt hooks back onto the needles.

The method employed by us of making the herein disclosed fabric comprises laying the body yarn 7 and the elastic yarn 8 for each of the courses 10a at substantially the same time, holding the elastic yarn 8 out of the path of the needles while the loops 9 of the body fabric 7a are being knitted, lifting certain loops of the last knitted course from their needles by lock-stitch or lace points while retaining the other loops of the same course on the needles, shifting the points and needles relatively to each other to form a shed 9a of loops, carrying the elastic yarn 8 in straight condition into such shed and then laying and knitting the next course of body yarn 7 to fasten the loops of the shedded course about the elastic yarn. While the elastic yarn can be included in very course if desired, it is preferred to float the bight 8a of the elastic yarn between two adjacent runs 8x over two or more courses 10 so that the courses 10a having elastic yarn therein are spaced two courses or a multiple thereof to increase the sustaining action of such yarn when the fabric is used as a garter. It is particularly important for certain uses that, in addition to the anti-ravel edge, the coursewise extent of the elastic yarn be less than the width of the fabric so that the fabric shall have walewise strips or zones X along the selvedges Y free from the elastic yarn which can be used for seaming in order to keep down the thickness of the seam and to prevent cutting the elastic by the sewing needles. This is provided for in the preferred method of and mechanism for making the fabric by beginning the shedding of the loops at points spaced inwardly from the walewise edges of the fabric and providing a special snapper action to ensure that there shall be no slack elastic yarn in the finished fabric so that the floated portions or bights 8a of elastic yarn shall not project materially beyond the embracing loops, but at the same time the elastic yarn 8 shall not be under any tension at the end of the knitting operation and the fabric will therefore lie flat and not contain any gathers or puckers. A coursewise pull on the knitted fabric will, however, stretch the elastic so that the fabric can be used as a garter.

If, however, it is so desired, the shedding can be extended completely to the edges of the fabric, or can be begun at one edge or approximately at one edge and be displaced correspondingly farther from the other edge.

Preferably, the fabric is single ply as illustrated in Figs. 4 and 5, and has an anti-ravel or picot course 3 along its top. For single ply fabric, course 3 is formed as illustrated in Figs. 5, 6 and 7. First, several plain courses 6 are knitted in the usual way and then the picot or lock stitch course 3. The latter, however, must be formed in a special way because the machine illustrated has a special lock stitch or lace bar 11. Ordinarily, the number of points 11a in bar 11 is one-half that of the needles 12a in the needle bar 12, so that the lace points being two needle distances apart, the two bars are of substantially the same length. As it is desired to use the bar 11 at a later point in the process for making a shed of loops beginning at points spaced inward from the walewise edges of the fabric, it is given fewer points than ordinarily and is substantially shorter than the needle bar. In order therefore that the lock stitches shall run entirely across course 3, it is necessary to dip and shift the bar 11 twice. The two bars 11 and 12 first are set in the position shown in Fig. 6 with the one end point 11a of bar 11 in alignment with the needle 12a at one end of bar 12 and the other points of lace bar 11 in alignment with odd numbered needles. Then, the bar 11 is dipped, raised and dipped at the proper point in the operation of the machine to lift the loops from the odd needles initially lying beneath the lace points and to transfer them to even numbered needles in the well known manner of making a picot course. Owing, however, to the deficiency of lace points 11a on bar 11, some loops on odd numbered needles are not operated on, there being a number of needles at the right hand end of bar 12 in Fig. 6 extending beyond the last lace point after the odd loops have been shifted, as will be clear from the figure. Therefore, the bar 11 is then moved so that the point at its other end, the right end as viewed in Figs. 6 and 7, is in alignment with next to the last needle in bar 12. As bar 12 always has an even number of needles, bar 11 now is set so that it again has its points above the odd numbered needles of bar 12 and, when it dips a second time, it does not disturb any loops already transferred but lifts only the odd numbered loops previously missed and transfers them to even numbered needles to continue the lock stitches to the end of the course 10 being operated on.

The means illustrated for positioning and shifting the lock stitch bar 11 to make the picot course 3 includes the center lace attachment 13 shown in Figs. 16 and 17 which is of a generally known form. The dipping action of bar 11 is caused by the narrowing mechanism 14 (Fig. 16) (also a common feature of flat knitting machines) of which the lock stitch bar 11 is an adjunct. Attachment 13 is mounted on the front narrowing shaft 15 being supported from a plate 16 which is fixed in turn to a sleeve 17 surrounding shaft 15. The upper end of plate 16 has fixed therein a pivot pin 18 on which is rotatably mounted a cam structure comprising cams 19 and 19a. Cams 19 and 19a are shown in Fig. 17 as formed of parallel plates, the front one of which, is for producing the lock stitch course 3 and the back member is for producing elastic courses 10a. A lever 20 is pivoted on plate 16 at 21 and carries at one end a roller 22 which bears against the edge of one or the other of two parallel plate cams 19 and 19a. The other end of lever 20 bears against a collar 23 on lock stitch shaft 24 from which lock stitch bars 11 are supported. Cam 19 and lever 20 lie in a plane parallel to shaft 24 and a pivoting movement of lever 20 shifts shaft 24 in one direction or permits it to shift in the other direction under the influence of a spring not shown. Cam 19 has a circular segment the radius of which is the maximum radius of the cam 19 so that when roller 22 is on said circular segment shaft 24 is thrust the maximum distance in one direction, toward the left when viewed as in Fig. 16. When cam 19 is turned so that roller 22 first runs off the sector of maximum radius, bar 11 is first shifted only one needle distance to the right. The next turn of cam 19 shifts bar 11 to the right until its right hand point 11a is only one needle distant from the right hand needle 12a. The next step of cam 19 shifts bar 11 its maximum distance to the right and a further step of cam 19 throws bar 11 to the left to its substantially central position at which position the roller 22 is moved to the back cam 19a in the usual manner so that the lace points 11a will lift loops from the alternate needles when dipped but not lift any in the zones X along selvedges Y. Back cam 19a is quite round so that the machine will continue to make courses 10a containing yarn 8 whenever bar 11 is dipped as long as roller 22 remains on cam 19a and bar 11 also remains in its active position. In adidtion to the cams 19 and 19a pin or post 18 has mounted thereon a hub (not shown) and a toothed ratchet wheel 26 by which said hub and cams 19, 19a are moved. Parts 19, 19a and 26 are connected by bolts (not shown) and the united cams, concealed hub and ratchet wheel 26 are held in assembled position on post 18 by a resilient shield 27 of light sheet metal which is set somewhat lightly against wheel 26 by a nut 28. The post 18 carries also an outer sleeve 29 (Fig. 17) which surrounds and conceals the inner hub and is arranged to swivel thereon. Sleeve 29 has fixed thereon a bell crank lever having two arms 30 and 30a, the former of which carries a pawl 31 for racking wheel 26 when the arms on sleeve 29 are suitably oscillated and such oscillation is produced automatically by means hereinbelow described each time a dipping action of shafts 15 and 24 is caused by the usual narrowing motion. Post 18 also carries a hand wheel 80 which is normally pressed out against a nut 81a at the outer end of post 18 by a coil spring 81. Wheel 80 has a finger 82 thereon which projects close to the toothed edge of wheel 26, when in the position shown in Fig. 17. By pressing on the wheel 80, however, the end of finger 82 may be forced between two teeth of wheel 26 and by then turning wheel 80, the ratchet 26 and cam structure may be turned to set the cams 19, 19a, and thereby the bar 11, in any position desired, such as that for beginning a stocking.

As above mentioned, the shaft 15 from which shaft 24 and lock-stitch bars 11 are supported is part of the narrowing mechanism. The narrowing mechanism 14 illustrated is operated from the main cam shaft 33 as is usually the case. Also, as usual, shaft 33 is shiftable axially to occupy either one of two positions and the cams for operating the various motions or mechanisms of the machine are divided into two groups. The cams of one group are arranged to be active when shaft 33 is in one axial position, the knitting position, and those of another group when shaft 33 is in the other, the narrowing position, the axial position of the cam shaft being determined by the usual pattern chain motion 34. A cam 35 for the narrowing motion which causes the dipping of front narrowing shaft 15 is in the inactive position when the cam shaft is in its left hand position. Shifting of the cam shaft 33 to place cam 35 in action must occur, when knitting the fabric of Figs. 4 and 5, just after knitting the loops for course 3. At this time, a button on pattern chain 36 throws the chain motion 34 into action so that its roller 34a is thrown inwardly or rearwardly by a strong spring to engage the side of right shifting cam 37 to shift shaft 33 toward the right as viewed in Fig. 16 to thereby throw into operation the cam 35 which varies the level of the front narrowing shaft 15 and thereby the lock stitch shaft 24 to dip the bars 11 and points 11a. After the shaft 33 has made almost one revolution and shafts 15 and 24 with bar 11 have been dipped and raised again, chain motion 34 draws roller 34a forward to contact the left shifting cam 37a and return the shaft 33 to the knitting position again. The narrowing mechanism, however, includes narrowing combs 38 and 39, which are fixed to bars 40 and 41 and are movably supported from shaft 15 so that the points in the combs are at the same level as those in bar 11 when the latter are in active position. Combs 38 and 39 are shown in Fig. 16 outside the knitting field so that they will not act on the fabric during the dipping motion of shaft 15. However, in the ordinary action of the narrowing motion, the nuts Nn (only one of which is shown) on the narrowing head N are stepped at each dip of shaft 15 to move bars 40 and 41 to shift combs 38 and 39 toward the fabric. Owing to the repeated dips of bars 11 required to carry out the steps performed by them, the combs 38 and 39 would thereby be shifted to act on the fabric, an undesired effect at the time. The machine illustrated therefore is provided with means frequently employed in flat knitting machines whereby the nuts on the narrowing head, and therefore combs 40 and 41, may be prevented from shifting when the shaft 15 is dipped.

The dipping of lace points 11a being caused by the narrowing mechanism which includes the front narrowing shaft 15 and the narrowing cam 35, it is important to prevent the action of the narrowing points in combs 38 and 39 during the formation of the picot course 3 and the special courses 10a because the fabric having courses 3 and 10a is not narrowed for the reason that such fabric is usually in the welt of a stocking and the welt is the widest part of the stocking. Means for this purpose are shown in Figs. 16, 25, 26 and 27. The cam 42 shown in Fig. 16 causes the inward movement of the narrowing combs by acting on a roller 43 (Figs. 16 and 26) journalled in an arm 44 (Fig. 26) to raise and lower arm 44. The up and down motion of arm 44 acts through the usual linkage 45 to rack the threaded shaft or spindle 46 on narrowing head N. Nuts Nn on the spindle 46 are thereby moved to shift the combs 38 and 39 by connections not shown. The roller 43, however, is selectively controlled by the pattern chain so as not to contact with cam 42 except when desired. Roller 43 is mounted so it can be shifted longitudinally of cam shaft 33, and for this purpose a lever 48, pivoted on an intermediate vertical axis 48a (Fig. 26), has a forked end 48b which embraces the edge of roller 43. Except when caused to do otherwise by the pattern chain 36, fork 48b of lever 48 holds roller 43 just far enough to the right to make it cooperate with cam 42 when the cam shaft 33 is in its right hand position, lever 48 being held for this purpose by a rod 49 coupled to the other end of lever 48 and rod 49 being held to the left by a lever 50 coupled to the rod and pivoted at 51 on a vertical axis. Lever 50 has a fork 52 in which is pivoted on a horizontal axis 53 an arm 54 the forward end of which carries a vertical pin 55 on which is journalled a roller 56 adapted, when arm 54 is lowered, to bear against the side of a cam 57 having caming surfaces both on its side and periphery. Cam 57 is adapted to cause the roller 56 to swing to the right to thereby shift the front end of lever arm 48 to carry roller 43 to the right and to thereby avoid cam 42 and to prevent racking of the narrowing combs when shaft 33 moves to the right. In the position shown in Figs. 16, 25 and 26, such action is prevented by a lever 58 (Fig. 25) which is pivoted at its lower end to a fixed part of the machine at point 59. The upper end of lever 58 is notched to engage and support the forward end of a pivoted extension 60 of arm 54 to hold roller 43 and arm 44 active by holding roller 56 above the rim of cam 57. When desired, however, a button on the pattern chain 36 acts on lever 61 (Fig. 16) of the chain motion 34 to push rod 62 to the right and thereby push lever 58 which is connected to one end of rod 62 out from under extension 60. When this occurs, lever 60 drops down so that a roller 63, also pivoted on arm 54 but on a horizontal axis, rests on the periphery of cam 57. At the same time roller 56 drops into a cut-out 57a in the right side of cam 57 so as to engage the right side of cam 57 so that, as cam 57 continues to revolve, roller 56 moves to the right and throws roller 43 to the right long enough to prevent the roller 43 from operating linkage 45. Toward the end of the revolution of shaft 33, a projection 57b on cam 57 throws roller 63 upwardly and thereby permits lever 58, under the influence of a spring, not shown, to swing back under extension 60 to hold it and roller 43 in position to actuate the narrowing combs when desired. While, no use is made of the narrowing combs in making the fabric shown in Figs. 3 and 4 and at the top of Figs. 1 and 2, they, of course, are used in fashioning the leg and ankle portions of the blank shown in Fig. 2. On the other hand, when the narrowing combs are used on the leg section of the stocking blank, the lock stitch bar 11 is swung up out of the way so as not to act on the fabric.

The details hereinbefore set forth are directed to making a single ply fabric. In case a double-ply fabric suitable for a double ply welt is to be made, it is necessary only to set the buttons on the pattern chain and shift the roller 22 to cam 19 of the lace attachment 13 so as to produce the picot course 3 after a section suitable for one ply of a welt has been knitted after which the roller 22 is again shifted back to the cam 19a to produce the second half of the welt in the manner desired.

It will be seen that shaft 33 is shown in Fig. 16 in the left hand or knitting position, the cam followers or rollers being shown on the right hand cam disks, most of the cams on shaft 33 being provided in pairs so that the rollers are given the proper motion both in the knitting and non-knitting positions of the cam shaft or are kept idle on round disks when it is desired to keep their corresponding mechanisms out of action. As usual, the weight of the narrowing mechanism including that of shafts 15 and 24 rests during knitting largely on the idler disk 35a and when shaft 33 is "shogged" or shifted axially to the right, the weight is transferred to the lifting narrowing cam 35 which is shaped to cause a dipping of shafts 15 and 24 at two points in its revolution and to return the shafts 15 and 24 to their original level at the end of each revolution. Owing to the relatively short length of bar 11, the pattern chain 36 must have two buttons thereon set close together at one point to cause a shogging and dipping action on each of two successive revolutions of cam shaft 33. Such successive shogging and dipping actions when properly coordinated with the horizontal movements of bar 11 controlled by cam 19 produce the lock stitch course 3.

The coordination of cams 19 and 35 is produced by a cam 64 on shaft 33. Cam 64 is so placed that it is inactive when shaft 33 is in the knitting position, its follower roller 65 being shown in Fig. 16 on the idler disk 64a, companion to cam 64. Whenever shaft 33 has been shogged to the right, cam 64 is thrown into engagement with the follower 65 (Fig. 17). At the proper point in the succeeding revolution of shaft 33, the bent lever 66, at one end of which roller 65 is journalled, is pressed by the cam 64 downward and outward from the shaft to raise the rear end of the horizontal portion 66a of lever 66. The free rear end of portion 66a is pivotally connected to the lower end of a rod 67 the upper end of which is pivoted at 68 to a bell crank lever 69 one arm of which is pivoted to rock on the rear narrowing shaft 70 and the other arm of which is pivoted at 71 to the lower end of an upwardly inclined link 72 the forward end of which is connected by a pivot pin 73 to an arm 74 fixed to a sleeve 75 (Fig. 16) on shaft 15. Consequently, motion of roller 65 is transmitted through parts 66, 67, 69 and 72 to arm 74 to rock arm 74 and pin 73 about shaft 15 as an axis. Pin 73 (Fig. 16) projects from parts 72 and 74 parallel to shaft 15 to contact an arm 76 (Fig. 16) of a bell crank lever 77 (Fig. 17) pivoted on a bolt 78 fixed to plate 16. The lever 77 swings in a vertical plane perpendicular to shaft 15 and has a horizontal arm 79 which projects forward immediately beneath arm 30a so as to lift and lower arm 30a in response to movements of pin 73 to thereby rack cam 19 as previously described in properly timed relation to the dipping action.

After lock stitch course 3 of Fig. 5 has been completed across the entire width of the fabric, or as soon thereafter as convenient, the lock stitch bar 11 is brought to the position shown in Fig. 8 to assist in making the special course 10a (Figs. 4 and 5). Assuming that the fabric made in accordance with our invention is to be used in the welt portion of a stocking, yarn 7 may be heavier than the yarn used in the leg portion of the stocking, but, owing to the reinforcing effect of the elastic yarn 8 in course 10a and others like it, a welt made of the fabric herein disclosed is well reinforced and the same weight of body yarn may be employed throughout both the welt and leg portions of the stocking if desired.

In the fabric shown in Figs. 4 and 5, a course 10a containing elastic 8 follows immediately after course 3 and other courses 10a follow at regularly spaced intervals. A course 10a consists of ordinary loops 9 of body yarn 7, alternate loops of which, with the exception of those in strips X, lie on one side of and alternate loops of which lie on the other side of a straight run 8x of relatively heavy elastic yarn 8. The forming of a course 10a involves the use of two yarn carriers, one for each of yarns 7 and 8. Carrier 83 (Fig. 9) is used for laying yarn 7, which also forms courses 10, and carrier 84 (Figs. 9 and 20) is used for laying yarn 8. Carriers 83 and 84 are mounted to be reciprocated with two of the ordinary carrier bars a, b, c, d, e, f, g, or h (Fig. 20) as desired, carrier 84 being shown as mounted on the upper or forward bar h, this being the most convenient position for a carrier for laying yarn 8. Carrier 83 may use any of bars a to g, inclusive, equally well. As the special courses 10a are shown as separated by several plain courses 10, carrier 84 must remain stationary part of the time that carrier 83 is in operation. The friction box for yarn carrier 84 therefore must have certain special features. The friction box 85 for carrier 84 is shown in Figs. 18, 19 and 20, but that for carrier 83, may be entirely commonplace and is not shown. They both are operated by the usual friction box rod 86. Box 85 differs from the ordinary form in the length of transverse slide bar 87 (Figs. 18 and 19) and in the fact that bar 87 is connected to be moved by automatic means. The outer end of bar 87 carries a handle 87a and has a downward projection 87b adapted to engage a dog 88 on carrier bar h to drive the carrier bar in the usual manner.

The means illustrated for shifting bar 87 to engage and disengage the dog 88 comprises a shaft 89 having a straight spline 90. On shaft 89 is a sleeve 91 mounted to slide on the shaft but engaging the spline 90 to prevent it from turning relatively thereto. Friction box 85 has two arms 92 (Fig. 19) which reciprocate sleeve 91 on shaft 89 synchronously with box 85. Fixed to sleeve 91 is an arm 93 which is connected by a cylinder and socket joint 94 (Fig. 18) to the inner or rear end of bar 87 to reciprocate the bar whenever shaft 89 is oscillated. Near one end thereof, shaft 89 has an arm 95 fixed thereto (Figs. 18 and 19) the free end of which has a pin 96 pivoted therein and fixed to the upper end of a rod 97 (Figs. 16, 18 and 20) the lower end of which is pivoted near the rear end of a horizontal lever 98 (Fig. 20) which is carired, at 98a, by a bracket 98b fixed to the frame of the machine. At its rear end, lever 98 is engaged by the lower end of a spring 99, the upper end of which is held at a fixed level by the rear narrowing shaft 70 and therefore tends to throw shaft 89 in the counterclockwise direction to hold bar 87 forward in the position shown and in which its projection 87b will engage and move yarn carrier bar h. This position of the parts is shown in Figs. 18 and 19, but is not the more usual one, the majority of the fabric being free of yarn 8 and therefore requiring that rod h and carrier 84 remains stationary while it is being made. During the knitting of the plain courses in which yarn 8 is not incorporated, the lever 98 is held with its front end up and its rear end down by a vertical lever 100 the lower end of which is pivoted on bracket 101 fixed to the frame of the machine. Lever 100 is operated by a rod 102 which is operated in turn by a lever 103 incorporated in the chain motion 34. The lower end of lever 103 is arranged to contact with a button on pattern chain 36 to throw the upper end of the lever to the right as viewed in Fig. 16 to unlatch lever 100 from lever 98 to permit spring 99 to throw the parts so as to engage yarn carrier bar h with the friction box 85 to lay a length of elastic yarn 8.

The lever 98 carries a roller 98c, which engages a cam 105 on the cam shaft 33 and after laying an elastic course, the cam 105 raises the front end of lever 98 to permit the lever 100 to swing back under the lever 98 and hold it in a raised position, thereby maintaining the slide bar 87 in an inoperative position relative to the dog 88 on the carrier bar h. The lever 98 is held in a raised position until a button on the pattern chain unlatches the lever 100, permitting spring 99 to engage the slide bar with the carrier bar h, to lay another course 10a. The spacing of the elastic courses 10a in the fabric therefore are dependent upon the setting of buttons on the pattern chain 36 in the vertical plane of lever 103.

In the arrangement shown, the bar h of yarn carrier 84 has a greater throw than the bar having yarn carrier 83 thereon so that yarn 8 as laid extends between points lying outside the selvedges of the knitted fabric. The means shown for manipulating thread 8 includes, in addition to carrier 84, a pair of hooks 104 placed outside the knitting needles and movable both up and down and backward and forward roughly parallel to vertical planes parallel to the motion of the fabric. During the yarn laying portion of the knitting cycle, hooks 104 stand as shown in Figs. 9, 20 and 21, with their mouths 104a just about the level of the upper edges of the sinkers and dividers and so that a carrier tube 84a of the carrier 84 may pass through the mouths 104a (see Fig. 10). The carrier 84 is also provided with notches 84b in alignment with the mouths 104a of the hooks 104, which hold the yarn 8 centrally of the mouths 104a while the yarn is being fed from one hook to the other. In order to facilitate the threading of carrier tube 84a an opening 84c is preferably provided at the back of the tube. The two yarns 7 and 8 are laid at the same stroke of the friction box rod 86 with the carrier 83 slightly in advance of carrier 84 which lays yarn 8 along the top edges of the sinkers. Carrier 84 may be ahead of the slur cock, but, with the arrangement shown, there is then danger that yarn 8 may catch on the upper corners of the sinkers. Yarn 7, of course, is laid on the noses of the sinkers in the usual way.

The relative positions of the two yarn carriers 83 and 84 and the sinkers, dividers, transfer points 11a, the hooks 104, and the yarns 7 and 8 at the point in the cycle just before the knitting needles engage the new loops are shown in Fig. 9. The yarn 8 has been laid and lies along the tops of the dividers and sinkers and between one hook 104 at one end and carrier 84 at the other, extending also through the hook 104 nearer carrier 84. The actions of the knitting needles in forming the ordinary loops are not illustrated, but such loops are knitted in the period between the positions of the parts shown in Fig. 9 and those shown in Fig. 10. The needle bar cam for the knitting operation may have the usual shape. The presser cams, however, need to be a little higher than commonly used, both for the knitting and narrowing operations. During this period the dividers come forward and retract with the sinkers and both come forward again as usual. In order to prevent the yarn 8 from rubbing or catching on the sinkers and dividers, the hooks 104 are raised somewhat from the position occupied when yarn 8 is first laid before the dividers make their first forward stroke, the yarn having sufficient tension due to its snapper mechanism (hereinbelow described) to lift so as not to drag on the sinkers and dividers. Yarn 8 having been laid for a given course 10a shown in Fig. 9 and the loops for the course knitted, shaft 33 is shifted by cam 37 at the end of the same revolution. Due to the shift of the said shaft between the position of Fig. 9 and that of Fig. 10, the clutch of the usual coulier motion, which is not shown, has been thrown into inactive position whereupon the mechanisms which are actuated by the coulier mechanism during the normal knitting operations, remain idle when the cam shaft is in said shifted position. As is well known, the sinkers and dividers are forward almost to their fullest extent at the beginning of the shifting or shogging motion of shaft 33. For well known practical reasons, the cam for controlling the sinkers and dividers in the narrowing position acts to draw back the sinkers and dividers during the shifting period. After the shift has been completed, in order to form a course 10a, the lock stitch points 11a are brought into play. The sinkers and dividers therefore are thrust forward beginning almost immediately at the end of shift of shaft 33 and before the instant of Fig. 10 so that they cooperate with the points 11a in the ordinary way as the points next come down preparatory to picking the alternate loops off the needles. Also prior to the position shown in Fig. 9 the lock stitch bar 11 has been shifted by the spring associated therewith, as regulated by cam 19, to lie centrally of the needle bed, as near as may be. By the time the points 11a have been lowered by cam 35 sufficiently to close the beards of the needles and to pass between certain loops and the needles as shown in Fig. 10, the sinkers and dividers have begun to draw back again. The cam 35 then lifts the points 11a to the position shown in Fig. 11. The cam 19, however, is shaped to hold bar 11 in the same longitudinal position for a while so that points 11a do not transfer the loops thereon during the formation of any course 10a. In the period between Figs. 10 and 11, the points and needles both move upwardly at about the same rate for a time after the points once insert themselves into the loops. As the points 11a and needles 12a move up from the position of Fig. 10, hooks 104 are moved down so that their mouths 104a are at the same level as those of the sinkers and dividers as shown in Fig. 11, the mouths 104a, however, facing or opening in the opposite direction from those of the sinkers and dividers. The yarn 8 is then approximately at the level of the angles of the sinkers and dividers and the fabric at this instant is at the level of the tops of the sinkers, a point higher than any reached by the fabric in knitting on the ordinary flat knitting machine. (Therefore, the needle bar cam for the narrowing position and the narrowing cam 35 both have to be higher than for the ordinary machine.) The sinkers and dividers thereupon are pushed forward by the catch bar 106 to carry yarn 8 against the beards of the needles as shown in Fig. 12, the hooks 104 at the same time moving to points forward of the line of the needles thereby withdrawing the longer lower lips 104b of hooks 104 from beneath the yarn 8. At this time, the narrowing cam 35 has begun to again dip the points 11a to replace the loops thereon on the needles 12a on which they were formed and from which they were lifted. The needles 12a also go down at the same time, but the points 11a move downwardly faster than needles 12a, so that the yarn 8 is caught between the points and needles and held there as the sinkers and dividers draw back again. Fig. 13 shows the parts as they appear midway of the step of replacing the alternate loops on their needles. The sinkers and dividers continue to be moved rearwardly by bar 106 and the points and needles are carried down to move the fabric down against the top edges of knockover bits 107. However, as the needles continue their downward movement after the points come to a stop, one half the loops are drawn down below the horizontal plane of the fabric to form a shed 9a into which yarn 8 is forced, it being held by bits 107 so that the tops of the needles pass below it to contact the points (Fig. 14). By this time, the sinkers and dividers have been brought fully forward again and the needles thereupon begin to rise and, owing to the loops being below the sinkers, to strip the loops off points 11a and down onto the stems of needles 12a in preparation to shifting shaft 33 back to knitting position. Points 11a, however, rise faster than needles 12a so that points 11a are well up out of the way by the end of the revolution of shaft 33 in the right hand or narrowing position. The positions of the parts just before the shift back to the left hand or knitting position of shaft 33 are shown in Fig. 15. In the meantime, starting from the position shown in Fig. 12, the hooks 104 are raised and carried rearwardly to their initial position through a path avoiding yarn 8. The yarn 8 is held straight between the knitted loops with alternate loops above and alternate loops below it, but the yarn 8 is not caught between the loops for a distance at each edge of the fabric because of the relatively short length of bar 11, leaving seaming strips or zones X, X one along each of the selvedges Y, Y. After the sinkers and dividers have been retracted by the catch bar 106 for the third time in the revolution, the yarn carrier bar h is released by the end of bar 87, due to the action of cam 105 which raises lever 98 to permit a spring (not shown) on rod 102 and lever 103 to slip vertical stop lever 100 beneath the end of lever 98. The special friction box 85 is thereby maintained idle until the buttons on the pattern chain 36 initiate another elastic course 10a. The pattern chain thereupon causes the left shogging cam 37a to come into play to shift the cam shaft 33 back into its left position shown in Fig. 16 and to initiate the knitting of another set of courses 10 formed solely of loops of inelastic yarn 7.

After two or more courses without elastic yarn, the yarn 8 stretches from a point adjacent one edge of the fabric to the carrier 84. The fabric being on a level below the sinkers, the yarn 8 runs from the fabric along the inner face of one hook 104, around the corner of the hook at a level below the lip 104b and thence up to the yarn carrier. The yarn carrier being on a level slightly above lip 104b in alignment with the mouth 104a, when carrier 84 makes its next stroke, a bight of yarn 8 is wrapped around the lip 104b to form a loop 8b to sustain any tension placed on yarn 8 by its snapper. Preferably, also the hooks 104 are proportioned as shown so that yarn 8 extends beneath the sinkers and dividers and there is therefore no danger that it will be caught and damaged by their rounded lower ends as might occur if yarn 8 were to pass from the fabric to the hooks 104 across the tops of the sinkers and dividers and therefore be exposed to the relatively pointed upper corners thereof. When next released from lip 104b by the forward and downward motions of hooks 104, yarn 8 is free to float on the fabric parallel to the selvedge edges. Any looseness in the length of yarn 8 between the course in which it is being incorporated and the last one before it containing such yarn is prevented by the special snapper action for yarn 8. However, the yarn 8 is not under any tension in the finished fabric, so that there is no tendency of the fabric to pucker or gather and it lies flat. The yarn 8 being, however, much larger and stiffer than yarn 7 in the case shown, it projects in relatively pronounced ridges 108 (Fig. 3) on only one face; that is, the wrong face of the fabric, the upper face in Figs. 4 and 9. Such ridges, especially when spaced apart, greatly magnify the garter action of the fabric having yarn 8 therein when used in the welt of a stocking and the tension in the yarn 8, when the stocking is being worn, need not be so great as would be the case if the ridge effect were absent. The reason why yarn 8 projects only on one side of the fabric and leaves the other side smooth is that certain loops are pulled rearwardly by the points 11a as illustrated in Figs. 11, 12 and 13 thereby lengthening these loops relatively to the others and, as soon as the points 11a have been withdrawn from the longer loops, the draw-off tension is taken primarily by the loops which remain under the needles continuously maintaining them in the plain knit fabric and throwing the yarn 8 to one side. Of course, the degree to which yarn 8 projects from one face of the fabric depends on its size and its size compared to that of the body yarn. If yarn 8 is not only of good size, but considerably larger than the body yarn, the arrangement shown, the optimum garter effect is obtained.

The description of the operations partly illustrated in Figs. 9, 10, 11, 12 and 13 is based on a single ply fabric. In making a double ply welt we prefer to lift the lock-stitch bar 11 to rest position at the start of the first section to be used in the double ply welt and to throw it down and to put it and the center lace attachment 13 into operation by means of the pattern mechanism just at the start of the second section for the double ply welt. Afterward, the lock stitch bar is thrown to rest position again at the time the first course is topped back onto the needles.

The means for moving the hooks 104 is illustrated in Figs. 16, 17, 20, 21, 22, 23 and 24. In these figures, the hooks 104 are shown each in position for receiving yarn 8 from carrier 84, being so held by roller 109 (Fig. 21) which is resting on cam 110 on shaft 33, shaft 33 being in its left position and the knitting cams being active. The connection between roller 109 and hooks 104 comprises a lever 111 pivoted at one end on a pin 112 fixed to the frame of the machine, roller 109 being journalled on a pin fixed to lever 111 intermediate its ends. The other end of lever 111 is pivotally connected to the lower end of a rod 113 and is urged downwardly by a spring 114. The upper end of rod 113 is pivoted to the rear end of a short lever 115 (Fig. 22) the forward end of which is fixed to a shaft 116 pivoted in brackets 117 on the front bed member 118 of the machine. Shaft 116 runs lengthwise of the machine and has a series of short levers 119 fixed thereto, two for each knitting section. The rear end of each lever 119 (Figs. 22 and 28) is enlarged into a sleeve within which is a pin 120 held in place within the sleeve by a flange 121 at its top. The hooks 104 have horizontal offsets 104c at their lower ends which rest on the flanges 121 at the upper ends of pins 120 and are fixed to pins 120 by screws 122.

When the cam shaft has been shifted to the right, roller 109 then rests on cam 110a, which has a shape permitting lever 111 to dip at the proper point under the influence of spring 114 to lower rod 113 and thereby lower the rear end of arm 115 to swing shaft 116 counterclockwise as viewed in Fig. 21 and thereby to lower the rear ends of arms 119 which support the hooks 104. The movement of the arm 115 is such as to lower hooks 104 the amount required to carry out their functions in introducing the yarn 8 into the fabric, but even though arm 115 is rather short the arcuate motion given hooks 104 by such arm when lowered is not sufficient to disengage the hooks from the yarn 8. In order to increase the forward motion of hooks 104 at the desired point in their cycle, the lower end of each pin 120 has pressed thereon a short arm 123, Fig. 29, which lies parallel to the horizontal offset 104c of the hooks 104. The arms 123 are connected to links 124 by screws 125 and links 124 run forward beneath bed 118 to a pivotal connection with short arms 126 integral with sleeves 126a fixed on a shaft 127 pivoted in brackets 127a also fixed to bed 118. One end of shaft 127 has a sleeve fixed thereon integral with the rear end of a short arm 128 (Fig. 22) the front end of which is formed into a sleeve having a pivotal connection with the forked upper end of a rod 129. Rod 129 is inclined downward above lever 111 and fixed at its lower end to a pin pivoted in a lever 130, at a point 130a intermediate its ends. Lever 130 is pivoted at its forward end on the pin or post 112, alongside lever 111. Journalled on a pin on lever 130 is a roller 131 which rests on cam 132 when the cam shaft 33 is in its left hand position as shown. A spring 133 secured to the rear end of lever 130 holds roller 131 down against the cam 132 and so keeps the front end of arm 128 down and the hooks 104 rearward during the knitting operations. When shaft 33 has been shifted to the right, roller 131 is then on cam 132a one portion of which serves to raise the front end of arm 128 and thereby draw forward the links 124 and swing hooks 104 to increase the forward movement of hooks 104 at the time they are lowered by cam 110a. Owing to the fact that hooks 104 lie in their rearmost position at the beginning of the movement of the yarn carrier 84, it is necessary for the cam 110a to raise the hooks 104 abruptly immediately after shifting the shaft 33. As appears in Fig. 21, the cam 132a, however, maintains at least as small a radius as at the shift point for some distance thereafter. In order therefore, that the roller 131 may shift from the right cam 132 to the left cam 132a without first rising and then dropping, cam 132 is cut back axially as shown at 132x so that the roller 131 may miss the rise on cam 132 when the shaft 33 is shogged to the right.

If cam 132 were not cut back as indicated at 132x, the roller 131 would begin to ride up on the cam 132 before the completion of the longitudinal shift of shaft 33 and roller 131 would thereupon drop off the cam 132 onto a lower portion of the cam 132a during the revolution of shaft 33, causing an undesired jar as well as undesired movement of the hooks 104.

The movements of the catch bar 106 in projecting and retracting the sinkers and dividers to push the yarn 8 into position to be moved into the shed of loops 9a are caused by cam 134a (Fig. 25) which actuates the rear catch bar linkage 135 through the usual roller 136. Cam 134a causes only horizontal movements of the catch bar and is active when the cam shaft 33 is in its right hand position. As the catch bar 106 makes three movements forward and back during each rotation made by the shaft 33 in its narrowing or right hand position, the cam 134a has, as shown, three high points. Cam 134a operates also when the lock stitch course 3 is formed. Catch bar 106 is also moved horizontally during the ordinary knitting, and the cam for this purpose is shown at 134. Cam 134 is not substantially different, however, from the cam for the same purpose generally used. The front linkage 137 acts to raise and lower the front of the catch bar 106 to disengage and engage it with the sinkers during the ordinary knitting operation. Cam 138 shown in dotted lines in Fig. 25 and in full lines in Fig. 16 acts on linkage 137 through roller 137a. The form and action of cam 138 is not modified for purposes of the present invention. There is no action of linkage 137 when the cam shaft 33 is in its right hand position and roller 137 then rests on a round idling companion 138a (Fig. 16) of cam 138.

On account of the fact that the special friction box 85 is disconnected from yarn carrier bar $h$ at the end of each stroke of the bar $h$, means is provided for latching bar $h$ against rebound when it strikes its end stop so that it will always lie in a predetermined position when it is desired to reconnect it to box 85. Also the bar $h$ must be released from the latch means at the time it is to lay another length of yarn 8. The means for these purposes is illustrated in Figs. 30, 31 and 32 and is the same as that ordinarily used in connection with plating. In these figures, the carrier end stop nut 47 is shown mounted in the usual way so as to be moved by a threaded shaft 139 by which it may be shifted. Head 47 has stops 140 thereon, one of which is in alignment with bar $h$. In order to prevent rebound of bar $h$ when it hits its stop, a dog 141 is fixed to bar $h$ and tapered at the end toward the stop shown so as to ride under the down turned end of a latch lever 142 as the end of bar $h$ approaches its stop. Lever 142 is mounted to slide and pivot on a rod 143 supported from head 47 and dog 141 is so placed on bar $h$ that the end 142a of lever 142 drops down behind dog 141 practically at the instant the bar $h$ strikes its stop to hold the bar in an exact position. The friction box 85 then releases bar $h$ and the bar $h$ is held by dog 141 and lever 142 until friction box 85 has made two or some other even number of strokes so as to return to the position at which it dropped the bar h when the friction box 85 is reconnected to the bar h to cause it to lay another length of elastic yarn 8. In order that the movements of bar h and friction box 85 may be properly coordinated with the laying of yarn 7, lever 142 has a bell crank form and one arm thereof extends downwardly and forwardly from pivot 143 to a point immediately above the forward edge of the plating bar 144. Bar 144 has the same throw and timing as the friction box rod 86, being an ordinary part of the full fashioned knitting machine and driven from the usual coulier motion, not shown. The bar 144 has an oblong block 145 thereon on which is pivoted a dog 146 mounted in a cut-out on the under face of block 145 and has a pin 146a which projects up through an arcuate slot 145a in the top of block 145. A tension spring 147 between pin 146a and pin 145b on block 145 holds dog 146 normally in such position that its longer side lies flush against a side of the cut-out in block 145 which is toward the end of the machine and extends from the block at right angles to the longitudinal axis of the plating bar 144. The side of dog 146 which faces toward the center of the machine, however, is bevelled as shown at 146b to provide a camming surface. The lower end 142b of bell lever 142, moreover, has a rounded lip 142c which lies in the path of surface 146b. Consequently as the bar 144 moves toward the end of the machine from the position shown in Figs. 31 and 32, the longer and straight side of dog 146 strikes the lip 142c and turns about its own axis so as to slide by end 142b without disturbing the position of bar 142, spring 147 stretching to permit this. After bar 144 reverses and moves toward the center of the machine, camming surface 146b pushes lip 142c to one side thereby lifting lever 142 at the proper time to permit friction box 85 to follow the ordinary friction box at the desired interval. The lever 142 thus is seen to have a double function in that it not only prevents rebound and holds the bar in the position to be engaged automatically by friction box 85, but also serves to time box 85 and yarn 8 properly with respect to the body yarn 7 so that the yarn 8 is laid along the top edges of the sinkers shortly after the sinkers have been pushed forward by the jacks 148 (Fig. 17). As before stated bar h must have a longer stroke than the other bars so as to lay the yarn 8 through the hooks. The longer stroke for bar h can be provided for either by cutting back the stops for this bar at the ends of the machine or by cutting off a small amount at each end of the rod. It is assumed that the stroke of bar h has been thus lengthened relatively to the other yarn carrier bars.

The special snapper provided for yarn 8 has been mentioned hereinabove. It is illustrated in Figs. 17 and 20 and comprises a lever 149 pivotally supported from the rear beam 150 of the machine and having a roller 151 journalled at its front end and bearing on cam 152 (Fig. 16). The rear end of lever 149 is drawn upwardly by a tension spring 153 the upper end of which is hooked to shaft 70 so that roller 151 is held yieldingly against cam 152 and a rod 154 pivoted to the lever 149 near its rear end and extending upwardly therefrom is thereby held as high as permitted by the cam. The upper end of rod 154 is pivoted to a lever 155 arranged to oscillate a snapper shaft 156 on which two arms 157 and 158 are fixed. The outer end of rear arm 157 has a snapper spring 159 of leaf form fixed thereto and extending across and adapted to press against the outer end of the forward arm 158. Spring 159 projects forward from an arm 158 above a fixed bar 160. The elastic yarn 8 is led from the package in the moistening box 161 around a guide peg, then through the usual ring tension device, through a hole in arm 157, between the end of arm 158 and spring 159, through a hole in arm 158, and then down around another guide peg to the yarn finger 84. When rod 154 is held up and arm 158 thereby held down by cam 152, snapper spring 159 is raised from arm 158 by contact with the upper surface of bar 160 and yarn 8 thereby released from the pressure of spring 159 so that it is free to pay out. The cam 152 is shaped so that, at the beginning of the traverse of finger or yarn carrier 84 from one hook 104 to the other in laying thread 8 for a course 10a, the cam 152 operates the arms 157 and 158 to make spring 159 act on yarn 8 for a small portion of the stroke of carrier 84 to draw a bight of yarn 8 snugly about lip 104b. Owing to its conformation, the cam 152 then swings spring 159 against bar 160 to release yarn 8 so that it is free to pay out throughout a considerable part of the stroke of the carrier 84, but the cam 152 raises arm 158 to take up any slack in yarn 8 during the latter part of the stroke of carrier 84. The yarn 8, therefore, will be responsive to up and down movements of hooks 104 over the entire distance between the hooks and not sag so as to drag on the sinkers and dividers at any points between the hooks, as well as to avoid the possibility that yarn 8 may foul some of the needles during knitting of warn 7. The cam 152 then lifts the roller 151 so that arm 158 is at its maximum height to ensure that yarn 8 shall be tightly wrapped about lip 104b at the beginning of the return stroke in spite of the fact that the initial movement of carrier 84, being toward hook 104, tends to slacken yarn 8. Cam 152a is so shaped that, after shaft 33 has been shogged and roller 151 is on cam 152a, arm 158 is held so as to maintain tension on yarn 8 until the yarn 8 has been deposited in the angle of the loop shed 9a and the hooks 104 moved forward and points 11a moved down nearly into contact with the needles 12. (See Fig. 13.) Somewhat before the relative position of the parts shown in Fig. 13 is reached, however, the hook 104 on the side then removed from the yarn carrier 84 pulls its lower lip 104b out of the bight 8b of the yarn 8 which was formed around it at the beginning of the last stroke of carrier 84. The tension then on yarn 8 pulls up bight 8a between the last length of yarn 8 and the next preceding one so that it is removed from the selvedge and a strip X formed free from yarn 8. The tension is then released by the snapper action so that the thread 8 will lie flat in the fabric without puckering, after which the snapper draws lightly on the yarn 8 again to pull up any slack that may have developed, followed by a maximum pull by the snapper just at the shogging point so that the roller 151 may shift back to cam 152 at the height required on such cam at the beginning of a thread laying motion.

The ordinary snapper spring for body yarn 7 is shown at 162 (Fig. 17). The cam for snapper spring 162 is shown at 163 in Fig. 16. The action of the snapper mechanism for yarn 7 is the usual snapper action and is not described. It will be understood that the bars 11 and 12 are shown with sufficient points and needles to make the widest blank the machine is capable of, say a fourteen inch blank for long stockings. In case narrower blanks are desired it is necessary only to remove sufficient points from bar 11 so that the seaming zones X will be formed along the selvedges. In case of quite narrow blanks such as ten inch blanks for knee length stockings, it is necessary, in addition to removing some points 11a, only to increase the tension on the yarn 8 at the end of the stroke of carrier 84. This may be done conveniently by changing the set of the snapper arms 157 and 158 on shaft 156 to stop paying out yarn 8 somewhat earlier in the laying stroke. The stroke of carrier 84 is not changed while that of carrier 83 for yarn 7 is.

Of course, the improvements specifically shown and described, by which we obtain the above results, can be changed and modified in various ways without departing from the scope of the invention herein disclosed and hereinafter claimed.

We claim as our invention:

1. In a method of operating a flat knitting machine having vertical needles and horizontal sinkers to form a fabric having lengths of straight yarn held by knitted loops of another yarn, the steps comprising laying yarn for forming said straight lengths out of the path of the needles and at a level above the sinkers, forming a shed of loops of the knitted yarn, tensioning said first mentioned yarn and placing it in said shed while tensioned, and continuing the knitting to interlock the two yarns.

2. In a method of operating a flat knitting machine having a needle bar and hooks lying outside the ends of said bar to form a fabric having lengths of straight yarn held by knitted loops of another yarn, the steps of laying the yarn for forming said straight lengths at substantially the same time as the yarn to be knitted and between said hooks so as to be held therebetween, and interengaging said straight lengths with said knitted loops.

3. A method of operating a flat knitting machine having horizontal sinkers comprising laying a body yarn along the noses of the sinkers in the usual way, laying a second yarn along the tops of the sinkers, knitting said body yarn to form loops, lifting some of said loops from the needles while allowing others to remain on the needles, placing said second yarn in front of all the needles between the loops on the needles and those which have been lifted, restoring said lifted loops to the needles, and continuing the knitting to interlock said second yarn with said body yarn.

4. In a method of operating a flat knitting machine having horizontal sinkers and dividers to form a fabric having lengths of straight yarn held by knitted loops of another yarn, the steps of forming a shed of knitted loops and of forcing said straight lengths by means of the sinkers and dividers of the machine successively each into position to enter said shed of knitted loops.

5. A method of operating a flat knitting machine having horizontal sinkers comprising laying a body yarn along the noses of the sinkers in the usual way, laying a second yarn along the tops of the sinkers, knitting said body yarn to form loops, lifting certain of the loops of said body yarn from the needles while allowing others to remain on the needles, placing said second yarn on a line in front of all the needles between the loops on the needles and those which have been lifted, restoring said lifted loops to the needles, and continuing the knitting to interlock said second yarn with said body yarn.

6. The method as set forth in claim 5 and in which the insertion of the other yarn between the knitted loops is performed in part by means of the sinkers and dividers.

7. A method of operating a flat knitting machine having a relatively short lock stitch bar comprising transferring loops by said lock stitch bar beginning at one selvedge, shifting said bar so that one edge thereof lies one needle distance from the other selvedge, transferring additional loops by said bar in the same course as said first mentioned loops to make a complete lock stitch course, continuing the knitting after the completion of said lock stitch course, shifting the lock stitch bar so that it is approximately an equal distance from each selvedge edge, interrupting the knitting and lifting certain loops of a given course from the needles by said bar while retaining other loops of the same course on the needles, inserting another yarn between the lifted loops and others retained on the needles, and continuing the knitting to interlock said other yarn with the yarn of said loops.

8. The method of operating a flat knitting machine having a plurality of yarn carriers and a reciprocatory rod from which said carriers receive operating impulses, comprising moving a yarn carrier for the body yarn and a yarn carrier for an additional yarn both at the same stroke of said rod but moving the second of said yarn carriers somewhat in the rear of the first and a greater distance on said stroke of said rod and taking up a portion of the length of said second yarn after each stroke of its yarn carrier so that it lies entirely within the selvedges.

9. A completely power driven flat knitting machine having automatic means for producing a lock stitch course entirely across the fabric, automatic means for lifting alternate loops from the needles over a portion only of a second course, and automatic means for inserting a yarn between the lifted loops of said second course and those remaining on the needles and for replacing said lifted loops on the needles on which they were formed.

10. In a flat knitting machine, in combination, a yarn carrier arranged to overrun the knitting field at each end, means to insert the yarn from said carrier into the ordinary knitted loops in a series of straight connected coursewise lengths, and means for tensioning yarn laid by said carrier to shorten the bight connected to successive coursewise lengths of said yarn.

11. In a Cotton type knitting machine, in combination, automatic means including a point bar for making a complete lock stitch course, and automatic means including said bar for lifting alternate loops from their needles over a portion only of a course and for returning them to the needles on which they were formed.

12. In a flat knitting machine in combination, a pair of hooks spaced from the ends of each needle bar, means for laying a yarn straight from one hook to the other, and means for releasing said yarn from said hooks and for catching said yarn in the ordinary knitted loops in straight crosswise lengths.

13. In a flat knitting machine in combination, a pair of hooks spaced from the ends of each needle bar, means for laying a yarn straight from one hook to the other, means for releasing said yarn from said hooks, and means for catching said yarn in the ordinary knitted loops in straight coursewise lengths shorter than the width of the fabric.

14. In a flat knitting machine having a main cam shaft, sinkers and dividers, in combination, means for laying a yarn and for knitting it into loops including a needle bar, a pair of hooks having mouths opening toward the rear of the machine and lying outside the ends of said bar, means for laying a second yarn between said hooks along the tops of the sinkers, means for lifting said hooks during a portion of the normal knitting cycle to lift said second yarn above the edges of the sinkers and dividers during the formation of said loops, means to shog the main cam shaft, means operable while said shaft is in shogged position first to pick some of the loops of the last knitted course from the needles, means to next lower said hooks to the level of the throats of the sinkers and dividers and to thrust the sinkers and dividers forward to force said second yarn against the needles, means for drawing said hooks forward to release said second yarn, means for returning said hooks to a level above the sinkers in a path avoiding said second yarn, and means for catching said second yarn between the knitted loops.

15. In a flat knitting machine having a main cam shaft, sinkers and dividers, in combination, a pair of hooks whose mouths face toward the rear of the machine and stand during normal knitting approximately at the level of the upper edges of the sinkers, a main cam shaft, camming means on said shaft operable when the shaft is in its narrowing position, and means controlled by said camming means for swinging said hooks downwardly and forwardly so that their throats lie substantially opposite the throats of the sinkers and dividers and for returning said hooks to their original level, and means operated from said cam shaft for thrusting the sinkers and dividers forward thrice during each revolution of the cam shaft when in narrowing position once after said hooks have been returned approximately to their original level.

16. In a flat knitting machine having a friction box rod and a cam shaft, in combination, means for laying a yarn for knitting and another yarn at the same stroke of the friction box rod, means for forming a course of loops from said knitting yarn, means to shift said cam shaft longitudinally to another position from that in which said course is formed, and means for inserting said other yarn in a straight length between loops of said course while said shaft is in said other position.

17. In a flat knitting machine having a friction box rod, in combination, means for laying at one stroke of the friction box rod both a yarn for knitting and a second yarn and extending said second yarn between points outside the edges of the fabric, means for forming a shed of loops from said knitting yarn, means for inserting said second yarn into said shed, and means for drawing up said second yarn before it has been put into said shed.

18. In a flat knitting machine in combination, a short lock stitch bar, a cam and means associated therewith arranged to hold and to shift said bar during and between two successive dips of the bar to make a lock stitch course entirely across the fabric, and to hold said bar thereafter centrally of the knitting field and then to lift alternate loops from the needles of a major portion but not all of the knitting field and replace said loops on the needles from which they were lifted.

19. In a flat knitting machine having sinkers and dividers, in combination, a needle bar, a pair of hooks mounted to move outside said needle bar, means for laying a thread to be knitted by the needles on said bar, means for laying a second thread from one of said hooks to the other and along the upper edges of the sinkers when the throats of the hooks are about at the level of the said edges, and means for raising said hooks and for tightening said second yarn to avoid contact of the second yarn with the sinkers and dividers during their back and forth motions in the knitting cycle.

20. In a flat type knitting machine having spring beard needles and sinkers, in combination, a yarn carrier for laying a yarn and means for knitting said yarn, a yarn carrier for laying an elastic yarn out of the way of the needles, means for pressing said elastic yarn against the needle beards by said sinkers, and means for inserting said elastic yarn in straight lengths in spaced courses of loops of said first mentioned yarn.

21. In a Cotton type knitting machine having spring beard needles and sinkers, in combination, a yarn carrier for laying a yarn and means for knitting said yarn, a yarn carrier for laying an elastic yarn at the same time yarn is laid for a knitted course but out of the way of the needles, means whereby said sinkers press said second yarn against the needle beards, means for inserting a laid length of said elastic yarn in a course of loops of said first yarn, and means whereby said second yarn carrier is held stationary after laying a length of elastic yarn during the formation of several knitted courses to space the lengths of elastic yarn in the fabric.

22. In a Cotton type knitting machine, in combination, means for laying and for knitting a yarn, a pair of hooks spaced from the ends of the needle bar, means whereby said hooks are so held at the time of laying said yarn that a line between them is out of the path of the needles, means for laying a second yarn between said hooks substantially at the same time a length of said first yarn is laid for a course to be knitted, and means for releasing said second yarn from said hooks and for catching it in the knitted loops in straight coursewise lengths in walewise spaced courses.

23. In a flat knitting machine in combination, a yarn carrier for laying a yarn to be knitted, two hooks spaced from opposite sides of the knitting field, and a second yarn carrier for laying a yarn at only a portion of the traverses of said first carrier from one of said hooks to the other outside the paths of the needles and so arranged relatively to said hooks as to wrap a loop around a lip of one hook near the beginning of each stroke of the second carrier.

24. In a flat knitting machine, in combination, a carrier for yarn to be knitted, a second carrier for an elastic yarn to be caught into at least some of the courses of knitted loops, and a pair of hooks, one on each side of the knitting field, for supporting said elastic yarn and facing away from the direction of travel of the fabric during knitting, said second carrier having a yarn delivery tube bent to enter the mouths of said hooks.

25. The combination as set forth in claim 24 and in which the yarn carrier for the elastic has notches in the end of its delivery tube for delivering yarn substantially horizontally and an aperture at its bend to facilitate threading.

26. In a flat knitting machine having vertically movable needles and horizontal sinkers, in combination, two hooks mounted to move in planes transverse to the sinker bed but adjacent the ends thereof, a yarn carrier for laying a yarn to be knitted, a second yarn carrier for laying another yarn from one of said hooks to the other outside the paths of the needles and so arranged relatively to said hooks as to wrap a loop around a portion of one hook near the beginning of each stroke of said second carrier.

27. In a flat knitting machine in combination, means to lay two yarns at substantially the same time, means to form courses of loops from one of said yarns, a pair of movable hooks arranged to move transversely to the plane of the fabric adjacent the selvage edges, means whereby the other of said yarns is looped around first the one of said hooks at one side of the fabric during the laying of the yarns for one course and around the one of said hooks at the other side of the fabric during the laying of the yarns for a subsequent course, and means to withdraw said hooks from said loops of the other yarn in the order in which such loops are formed.

28. The method of operating a flat knitting machine having horizontal sinkers, spring beard needles, a friction box, lock stitch points adapted to lift loops from and to restore them to the needles comprising laying a ground yarn and another yarn at the same stroke of the friction box rod, maintaining said other yarn out of the path of the needles while knitting a course of loops of said ground yarn, lifting certain of the loops of said course by said points, bringing said other yarn against the needle beards, bringing said points close to said other yarn on the opposite side thereof from the needle beards, holding said other yarn while said needles and points are lowered and the points and needles brought together to move the other yarn to the opposite side of the needles from the beards and between loops of said course, and raising said points and said needles while holding the fabric but raising the points more rapidly to replace all the loops on the needles and to move them down on the needles.

29. In a flat knitting machine in combination, a needle bank and means to lay a body yarn to be knit thereby to form a fabric, a pair of members mounted to move outside the selvage edges of the fabric and having lips tapering in the direction generally opposite to the movement of the fabric being knitted, means to lay another yarn and to wrap it around one of said lips near the beginning of a motion of the means to lay the other yarn, means to form and knit new loops into the old loops to form a course, means to move said members to bring said other yarn against the face of the needle bank against which the body yarn moves in the knitting operation and to withdraw said lip from the loop thereabout, and means to engage said other yarn in the loops of said fabric.

30. In a flat knitting machine, the combination as set forth in claim 29 and in which the means to engage the other yarn in the fabric comprises means to pick off certain loops only of a course from the needles, means to introduce a straight length of the other yarn between said picked off loops and those of the same course remaining on the needles, and means to replace said picked off loops on the needles.

31. The method of operating a knitting machine having vertically movable spring beard needles and horizontal sinkers, comprising laying a ground yarn and knitting a course of loops therefrom, laying another yarn closely after said ground yarn, lifting certain loops of said course while retaining the remainder of the course on the needles, pressing said other yarn against the needle beards by the sinkers, forming a shed between the lifted loops of said course and the others, working said other yarn over the tops of all the needles and into said shed, and replacing said lifted loops on the needles.

32. In the method of forming elastic knitted fabric by lifting certain loops only of each of a number of courses from the knitting needles and inserting an elastic yarn between the lifted loops and those remaining on the needles, the steps comprising lifting from the knitting needles a group of loops in first one and then another of each of a number of spaced courses within an area spaced from both the walewise edges of the fabric, laying a length of elastic yarn for each of said spaced courses between points outside the knitting field, tensioning said lengths, placing one of said tensioned lengths between each group of lifted loops and those of the same course on the needles, replacing each lifted group of loops after the insertion of elastic yarn, and releasing the tension on each one of said lengths in turn to cause the elastic yarn to lie entirely within the edges of the fabric.

33. In a method of operating a flat knitting machine having a needle bar and hooks lying outside of the ends of said bar, the step of laying two yarns at substantially the same time and one of them between said hooks so as to be held therebetween.

34. In a method of operating a flat knitting machine having a needle bar and hooks lying outside of the ends of said bar, the steps of laying two yarns at substantially the same time and one of them between said hooks so as to be held therebetween, forming the other of said yarns into loops forming parts of a fabric, and incorporating the yarn initially held by said hooks into said fabric in substantially straight form.

35. In a flat knitting machine, in combination, means to lay a textile yarn and an elastic yarn at substantially the same time, means to form courses of loops from said textile yarn, a pair of movable members whose upper ends have portions offset toward the rear of the machine and arranged to move transversely to the plane of the fabric outside the selvage edges in a path generally inclined forwardly and downwardly, the means for laying said elastic yarn including a yarn tube arranged to traverse a greater distance than the space between said members and to pass above said offset portions of said members when laying yarn, and means to form sheds of loops of at least certain of said courses and to place said elastic yarn therein including means to time the movements of said yarn tube for the elastic and said members so that the elastic yarn is wrapped around one of said offset portions by the yarn tube at each stroke of the tube and the offset portion withdrawn from the loop so formed before the next operation of the yarn tube for the elastic yarn.

GUSTAV GASTRICH.
HERBERT ERICH HAEHNEL.